(12) United States Patent
Yano

(10) Patent No.: US 7,644,101 B2
(45) Date of Patent: Jan. 5, 2010

(54) SYSTEM FOR GENERATING AND MANAGING CONTEXT INFORMATION

(75) Inventor: Takashi Yano, Tokyo (JP)

(73) Assignee: Ricoh Co., Ltd., Tokyo (JP)

( * ) Notice: Subject to any disclaimer, the term of this patent is extended or adjusted under 35 U.S.C. 154(b) by 288 days.

(21) Appl. No.: 11/516,760

(22) Filed: Sep. 7, 2006

(65) Prior Publication Data

US 2007/0055657 A1 Mar. 8, 2007

(30) Foreign Application Priority Data

Sep. 7, 2005 (JP) ............................. 2005-258875
Sep. 7, 2006 (JP) ............................. 2006-243463

(51) Int. Cl.
*G06F 17/00* (2006.01)
(52) U.S. Cl. ........................... 707/103 R; 707/1; 707/3; 707/4; 707/5; 705/1
(58) Field of Classification Search .................. 707/1, 707/3, 5, 103 R, 4, 530; 705/1
See application file for complete search history.

(56) References Cited

U.S. PATENT DOCUMENTS

| | | | |
|---|---|---|---|
| 6,363,377 B1 * | 3/2002 | Kravets et al. ................. 707/4 |
| 6,381,593 B1 | 4/2002 | Yano et al. |
| 7,096,226 B2 * | 8/2006 | Brock et al. ................. 707/100 |
| 7,359,893 B2 * | 4/2008 | Sadri et al. ..................... 707/3 |
| 7,392,249 B1 * | 6/2008 | Harris et al. ................... 707/5 |
| 7,409,402 B1 * | 8/2008 | Chan et al. .................. 707/101 |
| 2001/0049707 A1 * | 12/2001 | Tran ........................... 707/530 |
| 2003/0074368 A1 * | 4/2003 | Schuetze et al. ......... 707/103 R |
| 2005/0114351 A1 | 5/2005 | Yano et al. |
| 2006/0026013 A1 * | 2/2006 | Kraft ............................. 705/1 |
| 2006/0053154 A1 | 3/2006 | Yano |
| 2006/0167857 A1 * | 7/2006 | Kraft et al. ..................... 707/3 |
| 2008/0021926 A1 * | 1/2008 | Brock et al. ............. 707/104.1 |
| 2008/0091650 A1 * | 4/2008 | Fontoura et al. ............... 707/3 |
| 2008/0120276 A1 * | 5/2008 | Chennavasin .................. 707/3 |

FOREIGN PATENT DOCUMENTS

| | | |
|---|---|---|
| JP | 2000-29906 | 1/2000 |
| JP | 2005-148843 | 6/2005 |
| JP | 2006-48543 | 2/2006 |
| JP | 2006-48544 | 2/2006 |
| JP | 2006-79366 | 3/2006 |

\* cited by examiner

*Primary Examiner*—James Trujillo
*Assistant Examiner*—William Spieler
(74) *Attorney, Agent, or Firm*—Oblon, Spivak, McClelland, Maier & Neustadt, L.L.P.

(57) ABSTRACT

An apparatus, method, system, computer program and product, each capable of generating or managing context information in a manner useable or editable by an information management system. The context information describing the context in which a search task is performed is used to generate information useful to a user.

23 Claims, 21 Drawing Sheets

FIG. 11

| CONTEXT ID | SOURCE DATA ||||| DESTINATION DATA ||
|---|---|---|---|---|---|---|---|
| | USER ID | FOLDER | DOCUMENT ID | KEYWORD | SELECTION | FOLDER | ACCESS DOCUMENT ID | RECOMMEND DOCUMENT ID |
| 1 | P1 | F1 | D1 | d1 | | F2 | | D2 |
| 2 | P1 | F1 | D1 | d1 | | F2 | D2 | |
| 3 | P1 | F1 | D1 | | LIST | F2 | | D2 |
| 4 | P1 | F1 | D1 | | LIST | F2 | D2 | |
| 5 | P1 | F1 | D1 | d1 | BUTTON | F2 | | D2 |
| 6 | P1 | F1 | D1 | d1 | BUTTON | F2 | D2 | |
| 7 | P1 | F1 | D1 | d1 | | F2 | D3 | |

FIG. 12A

| CONTEXT TYPE | SOURCE FOLDER | SOURCE DOCUMENT ID | DESTINATION FOLDER | ACCESS DOCUMENT ID | RECOMMEND DOCUMENT ID | OTHER DOCUMENT ID | POINT |
|---|---|---|---|---|---|---|---|
| A | F3 | D3 | F4 | | D4 | | 20 |
| B | F4 | D4 | F3 | | D3 | | 16 |
| C | F3 | D3 | F4 | D4 | | | 10 |
| D | F4 | D4 | F3 | D3 | | | 7 |
| I | F3 | D5 | F4 | | D4 | D3 | 4 |
| J | F4 | D4 | F3 | | D5 | D3 | 3 |
| K | F3 | D5 | F4 | D4 | | D3 | 2 |
| L | F4 | D4 | F3 | D5 | | D3 | 1 |

FIG. 12B

| CONTEXT TYPE | SOURCE FOLDER | SOURCE DOCUMENT ID | DESTINATION FOLDER | ACCESS DOCUMENT ID | RECOMMEND DOCUMENT ID | OTHER DOCUMENT ID | POINT |
|---|---|---|---|---|---|---|---|
| a | F3 | D3 | F4 | | D4 | | 20 |
| b | F4 | D4 | F3 | | D3 | | 16 |
| c | F3 | D3 | F4 | D4 | | | 10 |
| d | F4 | D4 | F3 | D3 | | | 7 |
| i | F3 | D5 | F4 | | D4 | D3 | 4 |
| j | F4 | D4 | F3 | | D5 | D3 | 3 |
| k | F3 | D5 | F4 | D4 | | D3 | 2 |
| l | F4 | D4 | F3 | D5 | | D3 | 1 |

FIG. 13A

| CONTEXT TYPE | POINT | APPEARANCE RATE | TOTAL POINT |
|---|---|---|---|
| A | 20 | 4 | 80 |
| B | 16 | 7 | 112 |
| C | 10 | 2 | 20 |
| D | 7 | 5 | 35 |
| I | 4 | 9 | 36 |
| J | 3 | 14 | 42 |
| K | 2 | 25 | 50 |
| L | 1 | 33 | 33 |

FIG. 13B

| CONTEXT TYPE | POINT | APPEARANCE RATE | TOTAL POINT |
|---|---|---|---|
| a | 20 | 0 | 0 |
| b | 16 | 2 | 32 |
| c | 10 | 1 | 10 |
| d | 7 | 0 | 0 |
| i | 4 | 0 | 0 |
| j | 3 | 4 | 12 |
| k | 2 | 5 | 10 |
| l | 1 | 4 | 4 |

SYSTEM FOR GENERATING AND MANAGING CONTEXT INFORMATION

CROSS-REFERENCE TO RELATED APPLICATIONS

This patent application is based on and claims priority to Japanese patent application Nos. 2005-258875 filed on Sep. 7, 2005, and 2006-243463 filed on Sep. 7, 2006, in the Japanese Patent Office, the entire contents of which are hereby incorporated by reference.

FIELD OF THE INVENTION

The following disclosure relates generally to an apparatus, method, system, computer program and product, each capable of generating or managing context information in a manner useable or editable by an information management system. More specifically, the following disclosure relates to an apparatus, method, system, computer program and product, each capable of generating context information describing the context in which a search task is performed, and managing the context information in the form of metadata.

DESCRIPTION OF THE RELATED ART

Many people use web search engines to locate information on the web. For example, a user sends a search request to one or more web search engines, and selects one reference from the search result returned by the web search engines. However, the search result returned by the web search engines may not always contain information valuable to the user. One of the reasons for such low-quality search result depends on how the search engines conduct the search. The search engines usually return a list of document data each having one or more keywords contained in the search request sent by the user. The search engines may also use information regarding the past activities of the user, such as the access history of the user, to provide a list of document data that may be useful to the user, for example, as described in the Japanese Patent Application Publication No. 2005-148843. However, the user who often access specific document data may not always want to access the specific document data, since the user's need or desire tends to change depending on the context in which the user sends the search request.

BRIEF SUMMARY OF THE INVENTION

In order to improve the quality of the web search, or information search in general, context information describing the context in which the search request occurs may need to be obtained along with the search request, and managed in a manner usable or editable by the search engines or any other component of an information management system. For example, with the context information describing sequential jobs taken by a specific user for completing one search task, the information management system may be able to predict the need of the user with high accuracy, and provide information valuable to the user, such as a list of document data previously accessed by the user, even before the user actually instructs the system to perform a search. In another example, with the context information describing sequential jobs taken by general users for completing one search task, the information management system may be able to guide a user who is unfamiliar with conducing such search task, for example, by providing a list of keywords that have been used by a majority of users or a list of document data that has been accessed by a majority of users.

In light of the above, example embodiments of the present invention provide an apparatus, method, system, computer program and product, each capable of extracting one or more data elements from a plurality of data elements that are available from the interactions between the user and an information management system, and generating context information describing the context in which a search task occurs using the extracted data elements in a manner usable or editable by any other component, device, apparatus, or system existed on the information management system.

Other example embodiments of the present invention include an apparatus, method, system, computer program and product, each capable of receiving context information including a set of data elements that together describe the context in which a search task is performed, generating one or more metadata resources from the context information based on the interpretation of the context, and storing the one or more metadata resources in a manner usable or editable by any other component, device, apparatus, or system existed on the information management system.

Other example embodiments of the present invention include an apparatus, method, system, computer program and product, each capable of receiving context information including a set of data elements that together describe the context in which a search task is performed, generating one or more metadata resources from the context information based on the interpretation of the context, generating information useful to the user based on at least one of the metadata resources in a manner usable or editable by any other component, device, apparatus, or system existed on the information management system.

Other example embodiments of the present invention include an apparatus, method, system, computer program and product, each capable of storing one or more first metadata resources each describing a context in which a search task is performed, generating a search request before a user requests, selecting at least one of the first metadata recourses that corresponds to the search request, generating one or more second metadata resources using the selected one of the first metadata resources, and generating information that may be useful to the user using the second metadata resources.

Other example embodiments of the present invention include an apparatus, method, system, computer program and product, each capable of storing one or more metadata resources each describing a context in which a search task is performed, generating a search request before a user requests, selecting one or more metadata recourses that correspond to the search request, and generating information that may be useful to the user using at least one of the metadata resources.

In addition to the above-described examples, the present invention may be implemented in various other ways.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG 11 is an example table illustrating a set of data elements of context information stored in the form of metadata;

FIG. 12A is an example table explaining operation of classifying context information obtained for users in general and ranking the classified context information, according to an example embodiment of the present invention;

FIG. 12B is an example table explaining operation of classifying context information obtained for a specific user and ranking the classified context information, according to an example embodiment of the present invention;

FIG. 13A is an example table explaining operation of ranking classified context information for users in general according to an example embodiment of the present invention;

FIG. 13B is an example table explaining operation of ranking classified context information for a specific user according to an example embodiment of the present invention;

DETAILED DESCRIPTION OF THE INVENTION

Figure 1:
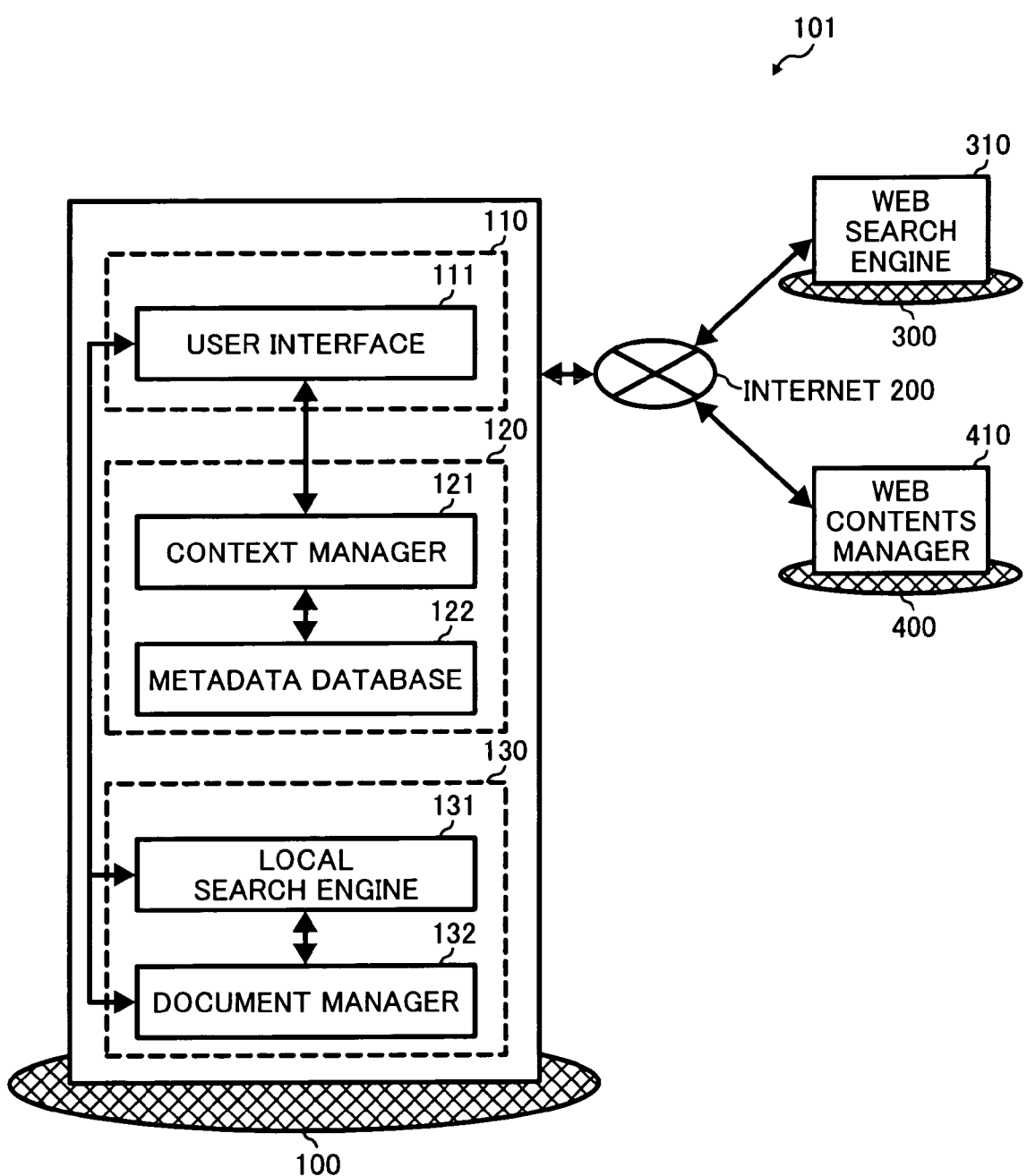
FIG. 1 is a schematic block diagram illustrating the structure of an information management system, according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an information management system 101 according to an example embodiment of the present invention.

As shown in FIG. 1, the information management system 101 includes a user interface 111, a context manager 121, a metadata database 122, a local search engine 131, a document manager 132, a web search engine 310 and a web contents manager 410, which are connected via the Internet 200. The user interface 111, the context manager 121, the metadata database 122, the local search engine 131, and the document manager 132 are provided at a client site 100. The web search engine 310 is provided at a search provider site 300. The web contents manager 410 is provided at a contents provider site 400. In addition to the sites 100, 300, and 400, the information management system 101 may include one or more sites, for example, an advertisement (AD) contents provider site. Further, any one of the sites 100, 300, and 400 may include one or more components, devices, apparatuses, or systems in addition to the component, device, apparatus, or system shown in FIG. 1.

The web contents manager 410 manages a plurality of web contents available on the Internet 200. For example, the web contents manager 410 stores various kinds of identification (ID) information for each of the web contents, such as the unified resource locator (URL) address of each web content. The web contents manager 410 may additionally store various kinds of attribute information for each of the web contents, such as the category assigned to each content.

The web search engine 310 performs searches on the plurality of web contents managed by the web contents manager 410. For example, the web search engine 310 may have access to a database storing one or more keywords in a corresponding manner with the ID information for each of the web contents. Once the user search request is received from the user interface 111, the web search engine 310 determines one or more keywords to be used based on the user search request. The web search engine 310 searches for one or more web contents that match the keywords, and returns a search result to the user.

Any one of the devices provided at the client site 100 may be incorporated in one apparatus, for example, as a personal computer, personal digital assistant (PDA) device, etc. Alternatively, as shown in the dashed lines in FIG. 1, any one of these devices may be incorporated in a plurality of apparatuses, which may be connected to one another via a local area network (LAN) or a wide area network (WAN) to create a local network system. For example, the user interface 111 may be implemented by a personal computer 111. The context manager 121 and the metadata database 122 may be implemented by a context management server 120. The local search engine 131 and the document manager 132 may be implemented by a document management server 130.

The document manager 132 manages a plurality of local contents existed at the client site 100. For example, the document manager 132 stores various kinds of ID information for each of the local contents, such as the URL address of each local content. The document manager 132 may additionally store various kinds of attribute information for each of the local contents, such as the category assigned to each content or the author of each content.

The local search engine 131 performs searches on the plurality of local contents managed by the document manager 132. For example, the local search engine 131 may have access to a database storing one or more keywords in a corresponding manner with the ID information for each of the local contents. Once the user search request is received from the user interface 111, the local search engine 131 determines one or more keywords to be used based on the user search request. The local search engine 131 searches for one or more local contents that match the keywords, and returns a search result to the user.

The user interface 111 allows the interactions between the user at the client site 100 and the information management system 101.

In one example, the user interface 111 assists the user in performing a search task. For example, the user interface 111 may reduce the number of steps to be performed by the user when the user requests for a search, for example, by providing a pop-up menu or a hypertext link as described in the U.S. Pat. No. 6,381,593, patented on Apr. 30, 2002, the entire contents of which are hereby incorporated herein. In another example, the user interface 111 stores a plurality of data elements that are generated when performing a search task, as context information describing the context in which the search task is performed. In another example, the user interface 111 may request for information that may be useful to the user even before the user sends a request. For example, the user interface 111 may request the context manager 121 or any kind of search engine to generate a search result, which lists reference document data or searched document data.

The context manager 121 manages the context information obtained from the user interface 111. In one example, the context manager 121 may receive context information having a set of data elements from the user interface 111 at a predetermined timing, and generate one or more metadata resources by organizing the set of data elements of the context information. The metadata resources may be stored in the metadata database 122 or in any other location accessible from the context manager 121.

In another example, the context manager 121 may update the set of data elements contained in the metadata resource every time the context manager 121 receives context information from the user interface 111. Alternatively, the set of data elements in the metadata resource may be updated at a predetermined timing.

In another example, the context manager 121 may select one or more metadata resources according to a request received by the user interface 111, and generate a search result using the selected ones of metadata resources. The search result may be provided to the user interface 111 for display, or it may be used for further operation such as searching by any kind of search engine.

As shown in FIG. 1, the context manager 121 and the metadata database 122 are provided at the client site 100. In one example, when the user desires to keep track of his or her own activities for future reference, the context manager 121 and the metadata database 122 may be preferably provided in a personal computer of the user. With this setting, the user may generate personalized metadata resources containing the set of data elements specific to the user. In another example, when the user desires to use the knowledge of other users, such as by referring to the past activities of the other users, the context manager 121 and the metadata database 122 may be preferably provided in the context management server 120 connected to the LAN or WAN. Further, the document management server 130 may not be provided at the user site 100.

Figure 2:
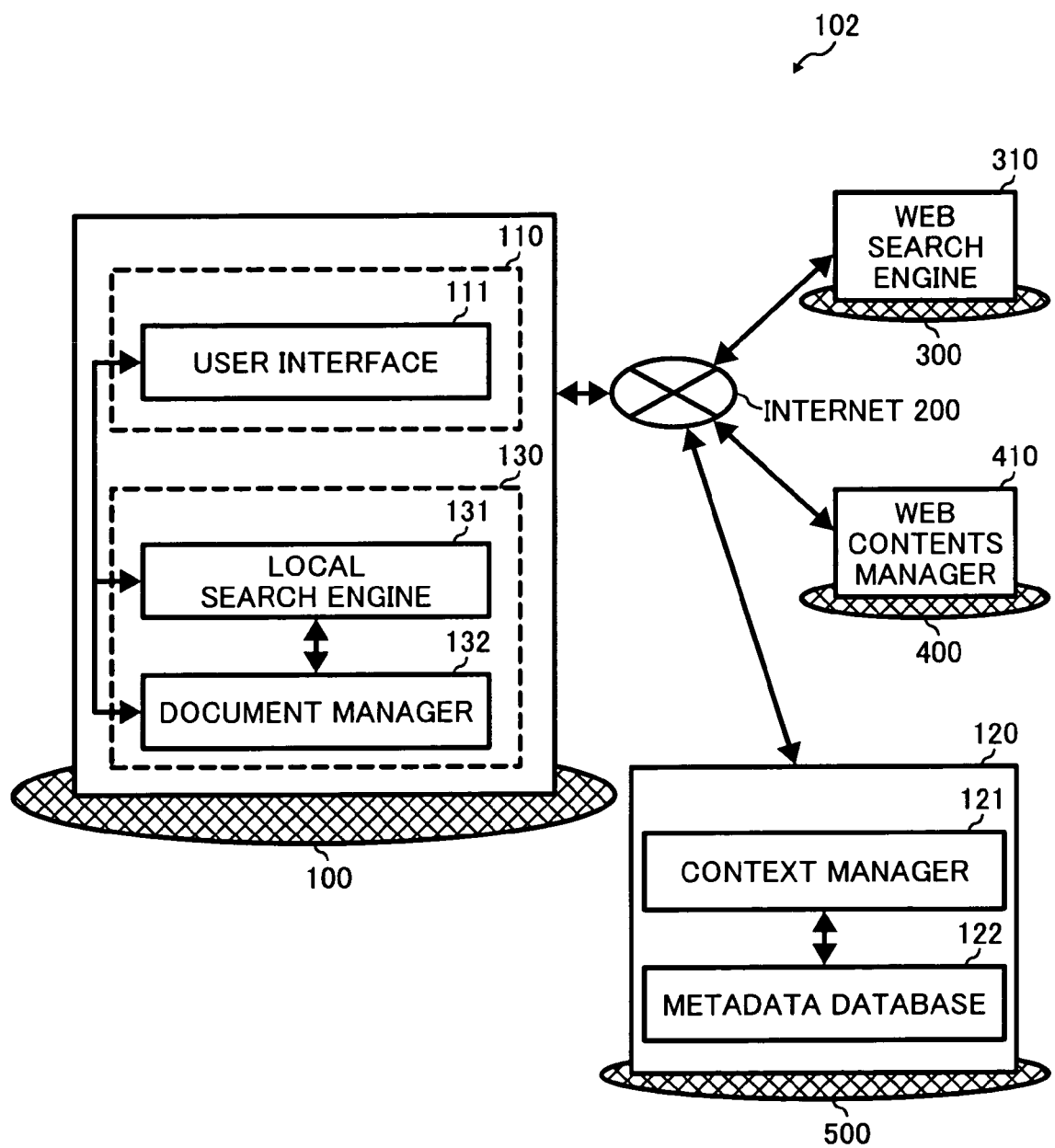
FIG. 2 is a schematic block diagram illustrating the structure of an information management system, according to an example embodiment of the present invention.
Figure 3:
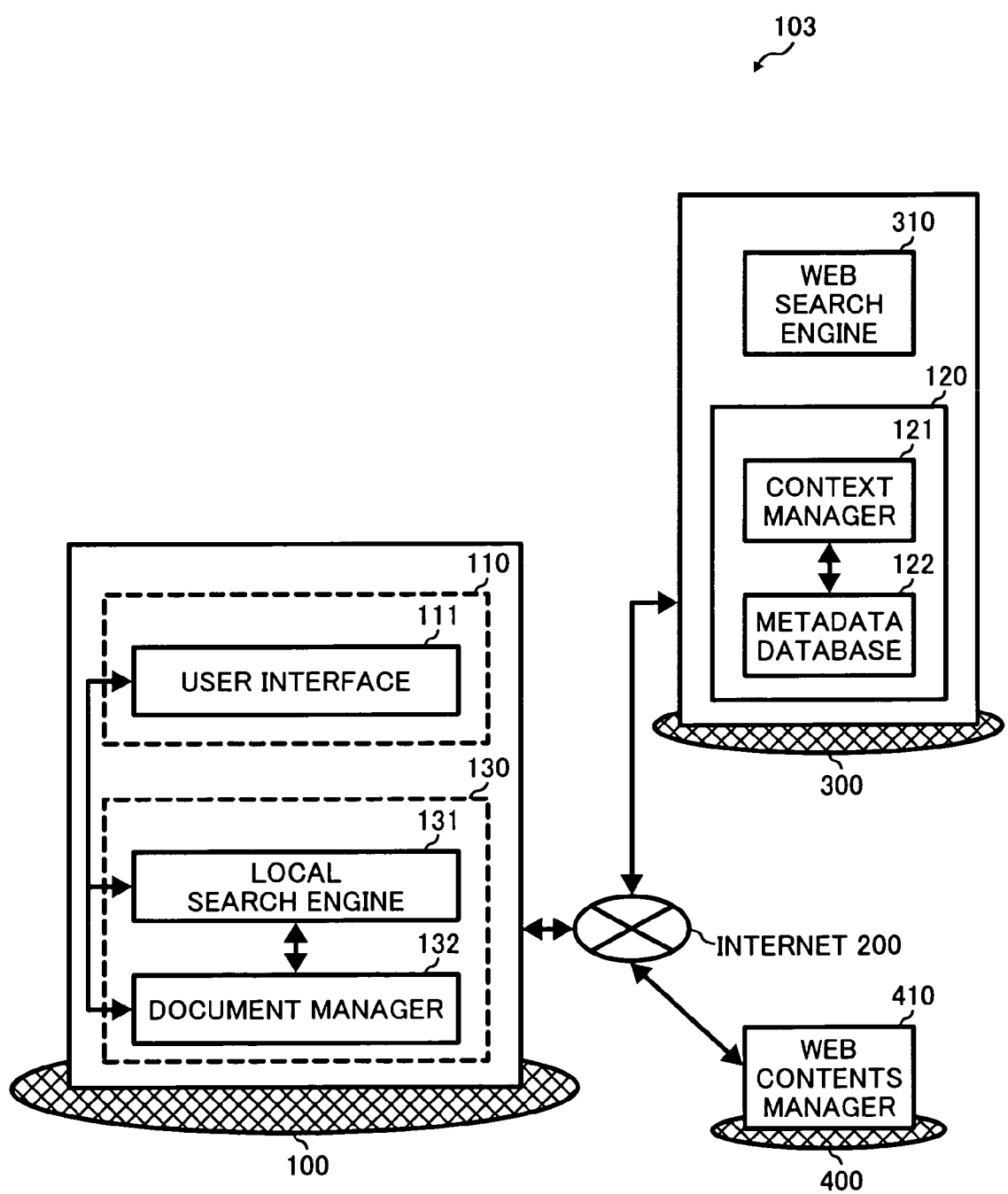
FIG. 3 is a schematic block diagram illustrating the structure of an information management system, according to an example embodiment of the present invention.

Alternatively, any one of the context manager 121 and the metadata database 122 may be provided at the site other than the client site 100, for example, as illustrated in FIG. 2 or 3. Alternatively, the context manager 121 and the metadata database 122 may be provided separately or together. Further, the components to be included in the information management system are not limited to the example case shown in FIG. 1.

The information management system 102 of FIG. 2 includes the context management server 120 at an application service provider (ASP) site 500. Referring to FIG. 2, the client site 100 provides the personal computer 110 including the user interface 111, and the document server 130 including the local search engine 131 and the document manager 132. The ASP site 500 provides the context management server 120 including the context manager 121 and the metadata database 122. The search provider site 300 provides the web search engine 310. The contents provider site 400 provides the web contents manager 410. In this example, the metadata resources may be shared by the general public using the Internet 200. The ASP site 500 may additionally include one or more components, for example, the document management server 130.

The information management system 103 of FIG. 3 includes the context management server 120 at the search provider site 300. Referring to FIG. 3, the client site 100 provides the personal computer 110 including the user interface 111, and the document server 130 including the local search engine 131 and the document manager 132. The search provider site 300 provides the web search engine 310, and the context management server 120 including the metadata manager 122 and the metadata database 122. The contents provider site 400 provides the web contents manager 410. In this example, the metadata resources may be shared by the general public using the Internet 200. The search provider site 300 may additionally include one or more components, for example, the document management server 130.

Figure 4:
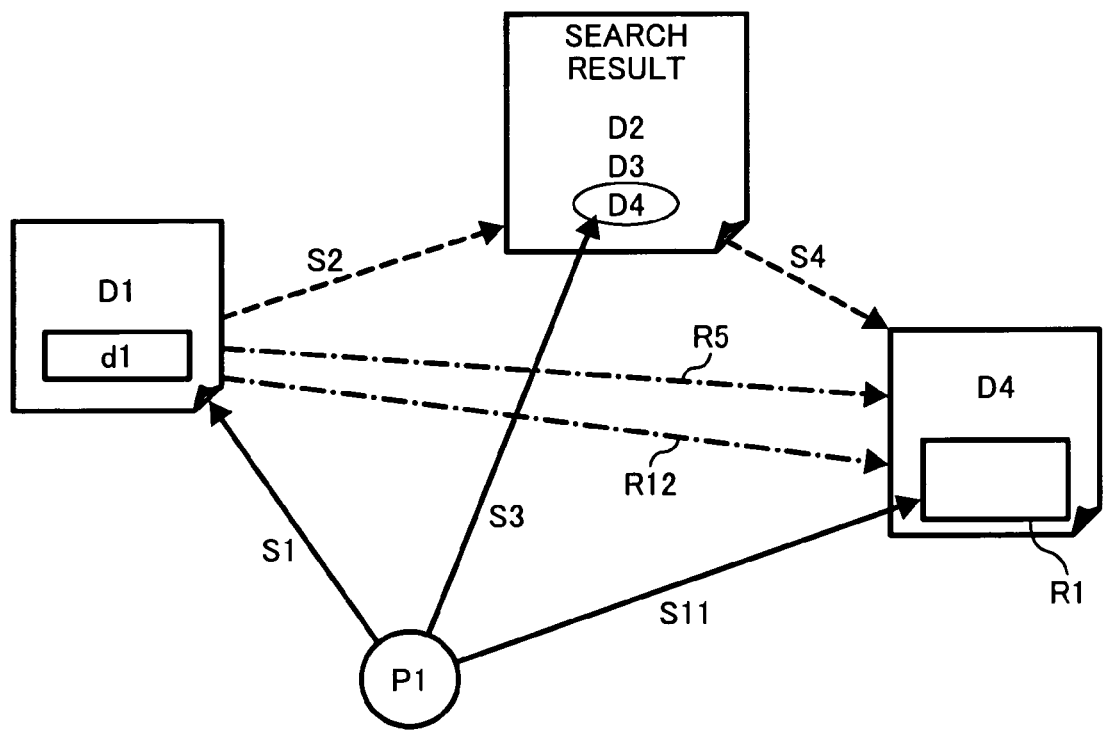
FIG. 4 is an illustration for explaining operation of generating context information, according to an example embodiment of the present invention.

Referring now to FIG. 4, operation of generating context information that describes the context in which a search task is performed is explained according to an example embodiment of the present invention. The operation of FIG. 4 may be performed by the user interface 111 shown in any one of FIGS. 1, 2, 3, 15, 17, and 19. In this example, as illustrated in FIG. 5, the user interface 111 includes a search assistant 112, a context information generator 113, and a context memory 114.

Referring back to FIG. 4, in this example, the context information may be captured when a user "P1" performs a sequence of one or more jobs in order to complete a search task. By capturing the jobs in sequence, the context describing how one document data is referred from another document data may be obtained, in addition to the fact that one document data is referred by another document data.

In one example, the search task may be completed by sequentially performing the jobs of displaying first document data D1 ("S1"), searching for document data that matches a keyword d1 selected from the first document data to generate a search result ("S2"), selecting second document data D4 from the search result ("S3"), and displaying the second document data D4 ("S4"). In this example, since the jobs S1 to S4 are performed as a result of the interactions between the user P1 and the user assistant 112 ("S1", "S4", and "S11") or the interactions between the user assistant 112 and the other application capable of searching ("S2" and "S4"), the user interface 111 may be able to easily interpret the context in which the search task is performed. Using this advantage, the context information generator 113 captures a plurality of data elements that are obtained by the user assistant 112 in relation to the search task for the user "P1", and stores a set of the data elements in the context memory 114 as context information. In another example, the search task may be completed by performing the job of recommending the second document data D4, for example, by selecting a recommend button R1 ("S11"), in addition to performing the jobs S1 to S4. Since the job S11 is also performed as a result of the interactions between the user P1 and the user assistant 112, the context information generator 113 may be able to easily interpret the context in which the search task is performed. The context information generator 113 captures a plurality of data elements that are obtained by the user assistant 112 in relation to the search task for the user "P1", and stores a set of the data elements in the context memory 114 as context information.

Figure 5:
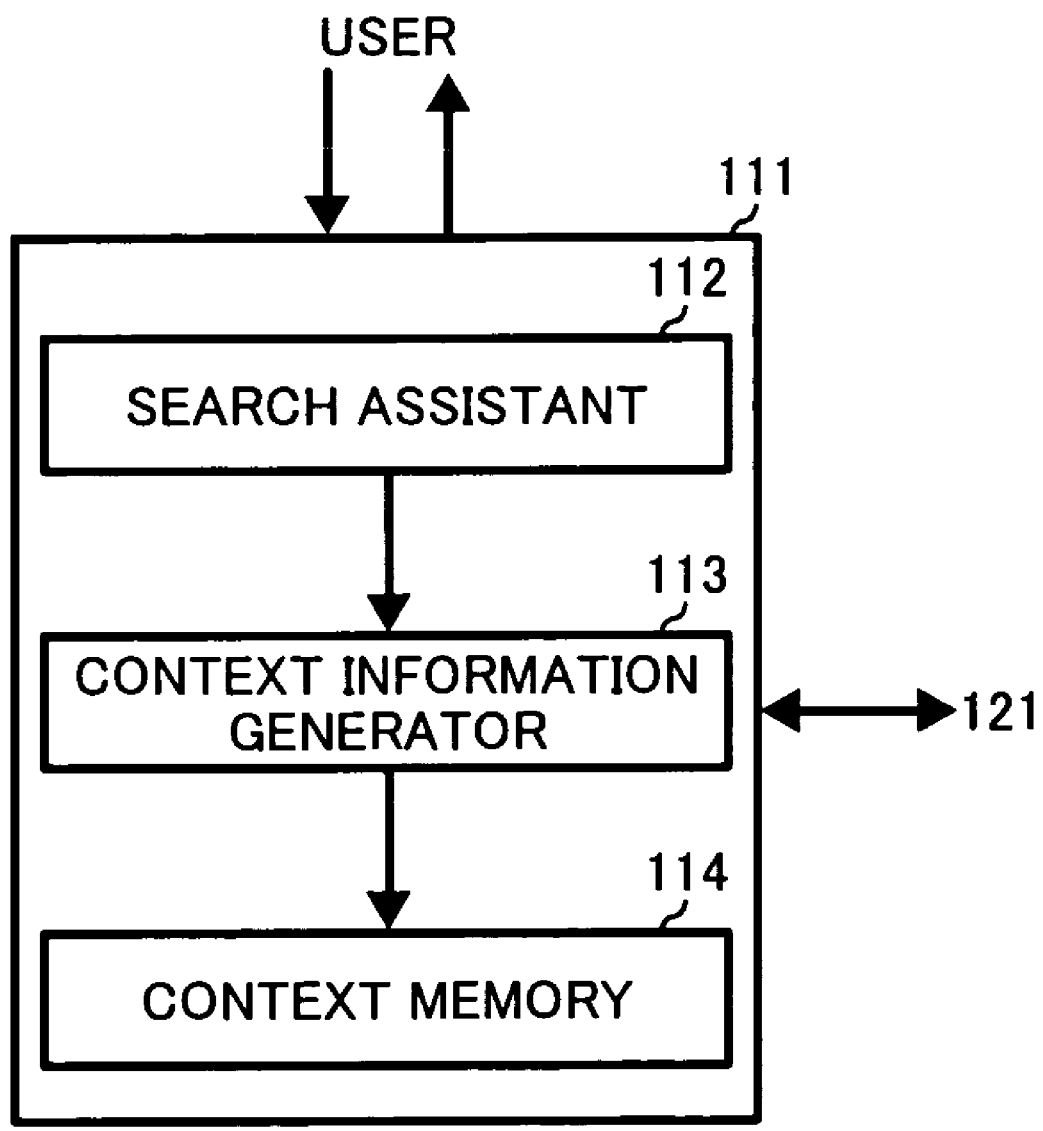
FIG. 5 is a schematic block diagram illustrating the functional structure of a user interface according to an example embodiment of the present invention.

More specifically, in this example, the context information generator 113 of FIG. 5 interprets the set of data elements into context information. In one example described above, as indicated by the arrow R5, when the jobs S1 through S4 are detected, the context information generator 114 interprets the context in which the search task is performed based on the plurality of data elements obtained by the user assistant 112. For example, the user ID "P1", the document ID of the first document data D1, the keyword d1, and the second document data D2 may be obtained in relation to the search task. For example, the context information generator 113 interprets that the second document data D4 is referred by the user "P1" from the first document data D1 as indicated by the arrow "R5". Further, the context information generator 113 interprets that the keyword d1 of the first document data D1 is used to search the second document data D4.

In another example describe above, as indicated by the arrow R12, when the job S11 is detected in addition to the jobs S1 to S4, the context information generator 113 interprets that the first document data D1 and the second document data D4 have a strong reference relationship based on the selection of recommend button R1. Further, the keyword d1 and the second document data D4 may be interpreted as having the strong reference relationship.

As described above, the context information generator 113 interprets the identification of two document data having the reference relationship, the identification of the user, or the degree or direction of the reference relationship, and generates the context information based on the interpretation. The context information is further stored in the context memory 114.

Figure 6:
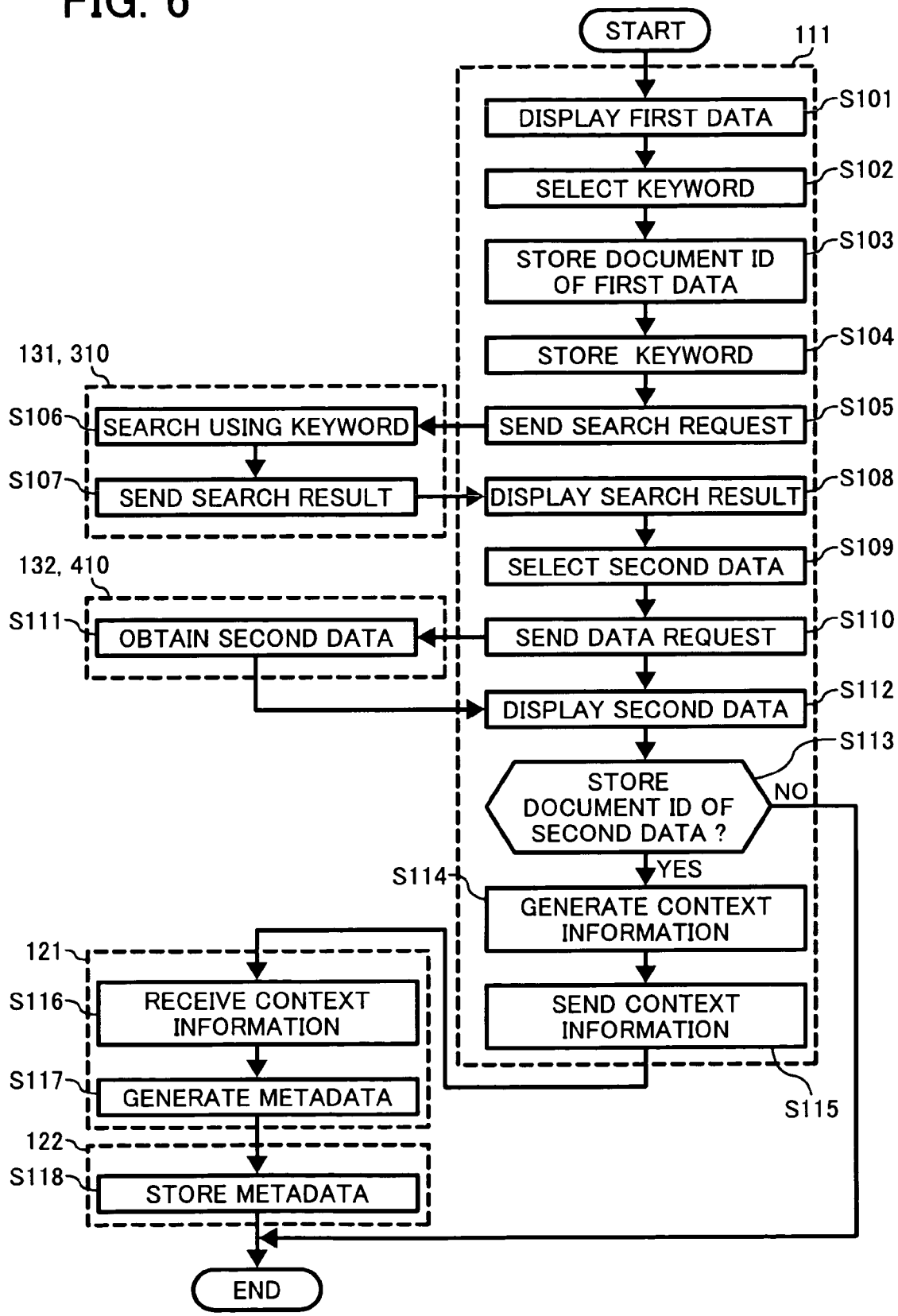
FIG. 6 is a flowchart illustrating operations of generating context information and generating metadata resources from the context information, according to an example embodiment of the present invention.

Referring now to FIG. 6, example operations of generating context information and storing the context information in the form of metadata are explained. The operation of generating the context information is performed by the user interface 111. The operation of storing the context information is performed by the metadata manager 121.

Figure 7:
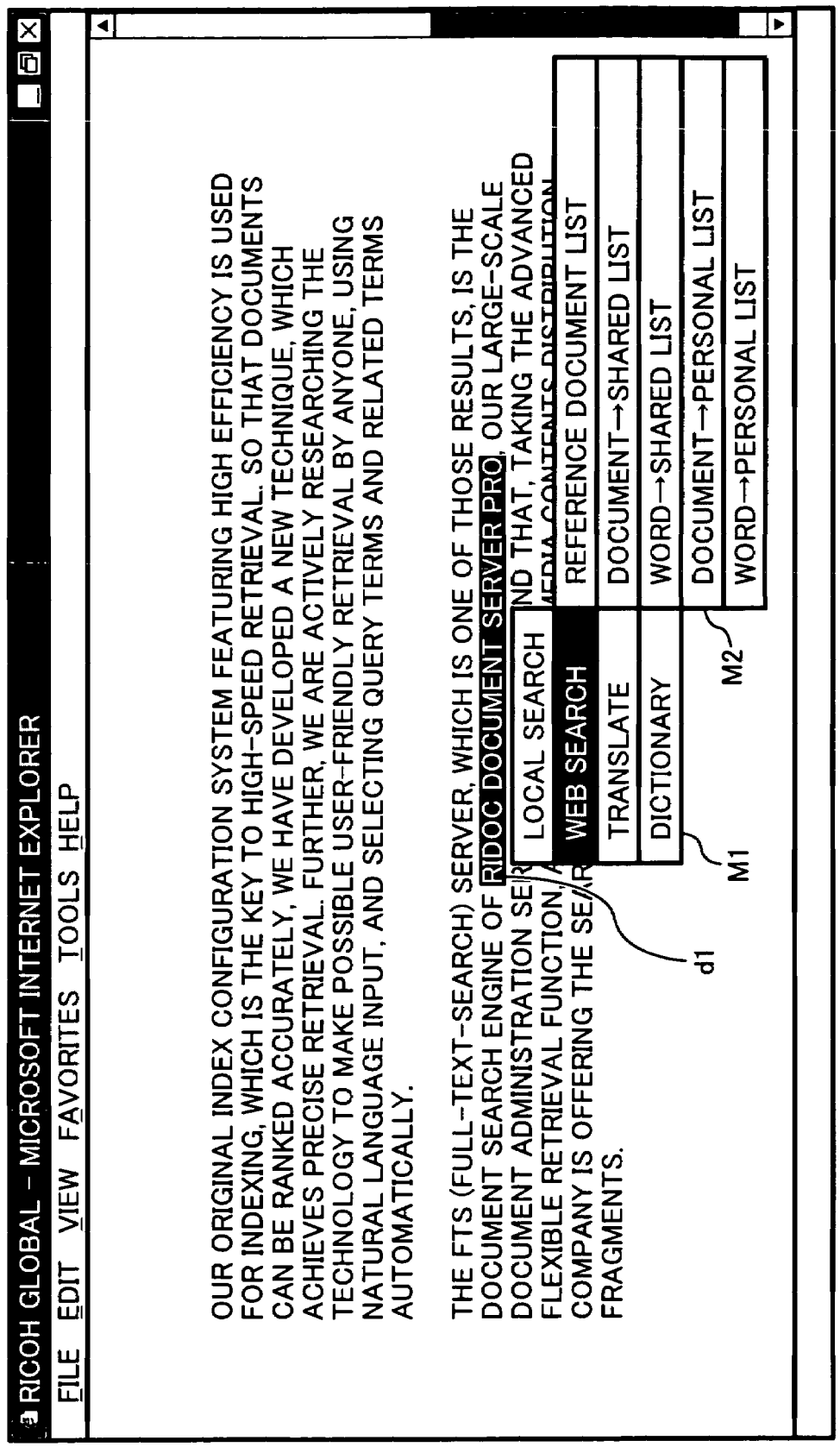
FIG. 7 is an example screen displayed to a user interacting with an information management system.

At S101, the user interface 111 displays document data, such as first document data D1 shown in FIG. 7. The first document data D1 may be any kind of data including one or more words that can be obtained, for example, via the document manager 132 or the web contents manager 410. However, any kind of data including picture data may be displayed as long as the keyword can be extracted in a corresponding manner with the data. In this example, the first document data D1 is displayed by a web browser provided at the user site 100.

At S102, the user interface 111 allows a user to select a keyword d1 from the first document data D1. The user may select the keyword d1, for example, by pointing the keyword d1 with a pointing device or a marking device. In this example, the keyword d1 includes any kind or any number of words, which may be extracted from a single word, a plurality of words, or a sentence. Alternatively, the search assistant may select a keyword that matches the first document data D1, for example, from a keyword database provided in the user interface 111.

Further, the keyword includes any kind of graphic representation, mark, symbol, etc., which may be sent by the user interface 111. For example, the keyword d1 may be selected by clicking on a keyword button, such as a keyword button K1 or any one of keyword buttons K2 shown in FIG. 8. The keyword buttons, such as a keyword button K1 or keyword buttons K2 shown in FIG. 8, may be previously stored in the user interface 111 for automatic display. Alternatively, the keyword buttons may be generated by the context manager 121 upon receiving a request sent from the user interface 111. For example, the keyword buttons may be generated based on a keyword metadata resource stored in the metadata database 122 as described below.

At S103, the user interface 111 stores the document ID "D1" of the first document data D1. The document ID "D1" may correspond to the URL address of the first document data D1 or any other kind of identification information.

At S104, the user interface 111 stores the keyword d1.

At S105, the user interface 111 sends a search request to at least one of the web search engine 310 and the local search engine 131, depending on the service selected by the user. For example, the user may select either one of the local search and the web search from a service menu M1 shown in FIG. 7. When the web search is selected, the user interface 111 sends a web search request, which may include the selected keyword d1, to the web search engine 310. When the local search service is selected, the user interface 111 sends a local search request, which may include the selected keyword d1, to the local search engine 131.

At S106, at least one of the web search engine 310 and the local search engine 131 performs the search using the keyword d1 to generate a search result indicating a list of document data that matches the keyword d1. At this time, one or more keywords other than the keyword d1 may be extracted using the document ID "D1", if a database storing one or more keywords is provided in the user interface 111.

At S107, at least one of the web search engine 310 and the local search engine 131 sends the search result to the user interface 111.

At S108, the user interface 111 displays the search result to the user. The search result may be displayed as a list of the searched document data with the hypertext links. The search result may additionally contain attribute information, such as the title or the abstract of the searched document data. Further, the searched document data may be ranked as described below.

At S109, the user interface 111 allows the user to select one document data from the search result, such as second document data D2, for example, by clicking the hypertext link to the second document data D2 with the pointing device coupled to the user interface 111.

At S110, the user interface 111 sends a data request to at least one of the web contents manager 410 and the document manager 132 to obtain the second document data D2. For example, when the web search service is selected, the user interface 111 sends a data request, which includes the document ID "D2" of the second document data D2, to the web search engine 310. When the local search service is selected, the user interface 111 sends a local search request, which includes the document ID "D2" of the second document data D2, to the local search engine 131. Alternatively, the destination of the data request may be determined based on the document ID "D2" of the second document data D2, such as the URL address describing the location of the second document data D2.

At S111, at least one of the web contents manager 410 and the document manager 132 obtains the second document data D2, and sends the second document data D2 to the user interface 111.

Figure 9:
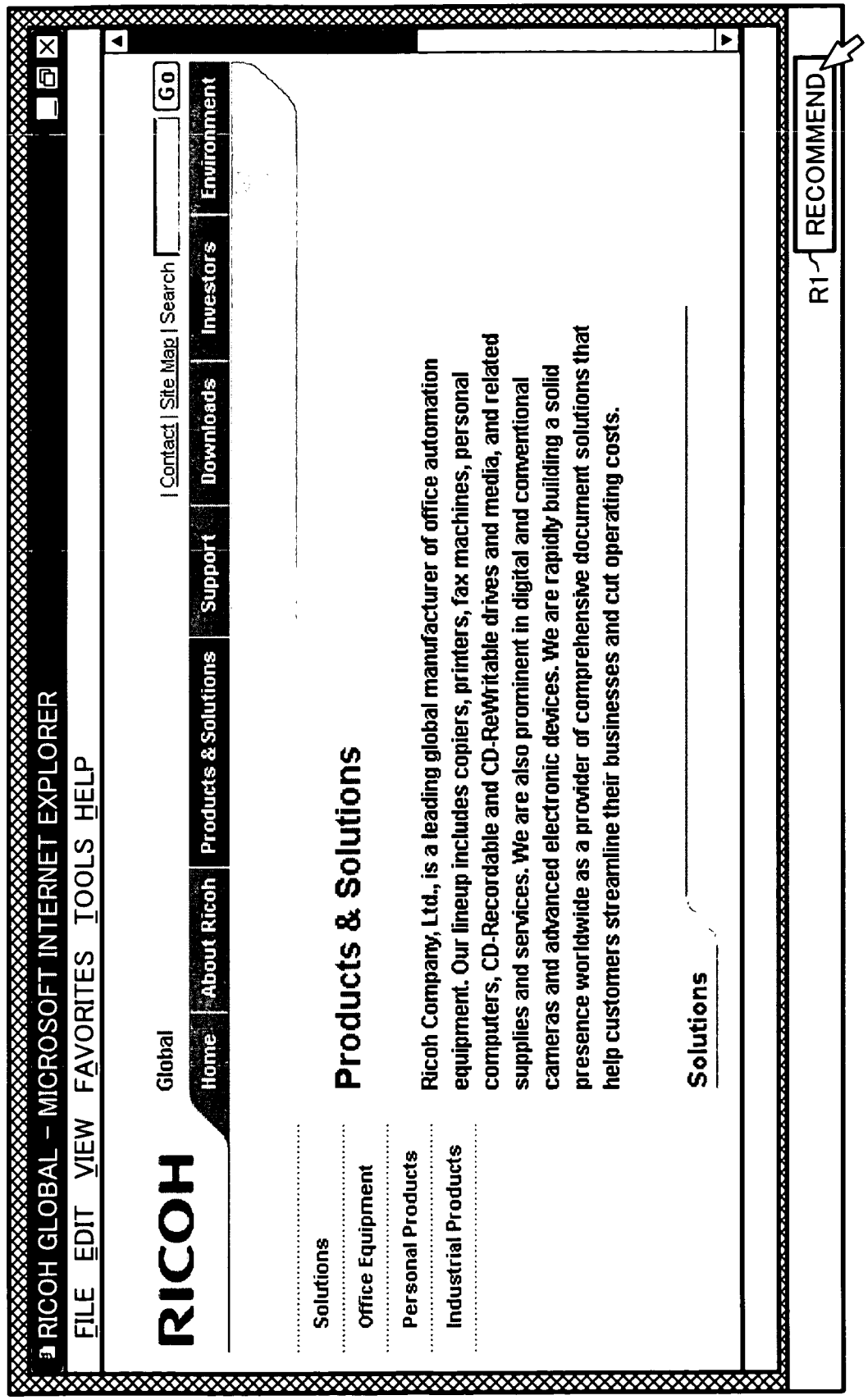
FIG. 9 is an example screen displayed to a user interacting with an information management system of the present invention.

At S112, the user interface 111 displays the second document data D2 to the user. At this time, the user interface 111 may display a recommend button R1, for example, as illustrated in FIG. 9. When the user determines that the second document data D2 contains information useful to the user, the user may select the recommend button R1, for example, by clicking the recommend button R1 with the pointing device coupled to the user interface 111. The selection of the recommend button R1 may be stored in the user interface 111.

At S113, the user interface 111 stores the document ID "D2" of the second document data D2. The document ID "D2" may be driven from the URL address of the second document data D2.

At S114, the user interface 111 generates context information, which describes the context in which the search task is performed. In this example, the user interface 111 stores a plurality of data elements that are obtained during a time period between a timing when the first document data D1 is displayed and a timing when the second document data D2 is displayed. For example, the document ID "D1" of the first document data D1, the selected keyword d1, the document ID "D2" of the second document data D2, and/or the selection of the recommend button R1 may be stored for one search task. The user interface 111 interprets the plurality of data elements into context information that describes the context in which the user task is performed.

At S115, the user interface 111 sends the context information to the context manager 121 at a predetermined timing. In one example, the user interface 111 may send the context information being generated every time the search task is detected. Alternatively, the user interface 111 may accumulate the context information for a plurality of search tasks, and send the accumulated context information to the context manager 121 at a predetermined timing.

At S116, the context manager 121 receives the context information from the user interface 111.

At S117, the context manager 121 generates one or more metadata resources based on the context information obtained at S116. To capture the reference relationship between the first document data D1 and the second document data D2, the data elements regarding the first document data D1 and the data element regarding the second document data D2 are classified as the source document data elements and the destination data elements, for example, as illustrated in FIG. 11.

The data elements may be further organized depending on how the metadata resources are used. In one example, the context manager 121 organizes the set of data elements of the context information in the order it receives from the user interface 111 to generate an integrated metadata resource. In another example, the context manager 121 organizes the set of data elements of the context information according to the user ID to generate a personalized metadata resource. In another example, the context manager 121 organizes the set of data elements of the context information according to the document ID to generate a document metadata resource.

At S118, the context database 122 stores the metadata resources generated by the context manager 121, and the operation ends. Alternatively, the metadata resources may be stored in another location in the information management system. For example, if the document metadata resource for the first document data D1 is generated by organizing the set of data elements specific to the first document data D1, the document metadata resource for the first document data D1 may be stored in the folder containing the first document data D1. In another example, the document metadata resource for the first document data D1 may be embedded into the first document data D1.

The operation of FIG. 6 may be performed in various other ways. In one example, any one of the steps illustrated in FIG. 6 may be performed in the order different from the above.

For example, the search result may be generated by the metadata manager 121 using one or more metadata resources. In this specification, the search result may correspond to any kind of reference document list generated by the metadata manager 121, or any kind of searched document list generated by any kind of search engine. For this reason, the search result and the document list may be used interchangeably.

In one example, when one or more metadata resources are stored in the information management apparatus, the user assistant 111 may send a request for sending a reference document list to the metadata manager 121 as described below. For example, the user assistant 112 may display a service menu M2 shown in FIG. 7 when the first document data is displayed. Referring to FIG. 7, the service menu M2 provides four types of a reference document list: a first type being a shared document list that lists document data relevant to the first document data D1; a second type being a shared keyword-driven document list that lists document data relevant to the selected keyword d1; a third type being a personalized document list that lists document data relevant to the first document data D1; and a fourth type being a personalized keyword-driven document list that lists document data relevant to the selected keyword d1. When the user selects one of the reference document lists, the user assistant 112 sends a request to the metadata manager 121 together with the document ID "D1" of the first document data D1, the keyword d1, or the user ID "P1" of the user. Using at least one of the data elements obtained, the metadata manager 121 generates the requested type of reference document list, and sends the list to the user assistant 112.

Figure 8:
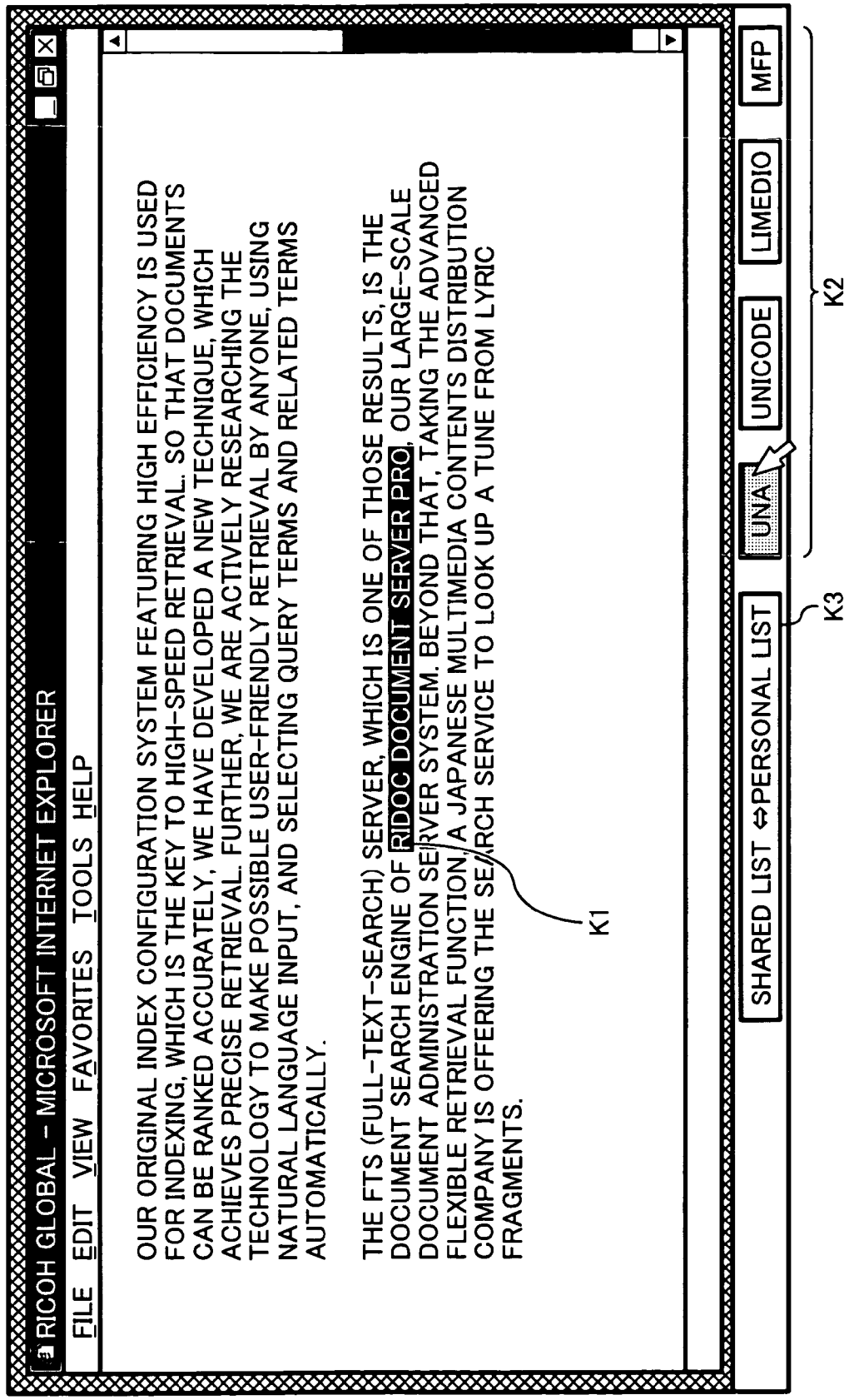
FIG. 8 is an example screen displayed to a user interacting with an information management system.

In another example, the selection on the reference document list may be made by selecting a document list button K3 shown in FIG. 8, in a substantially similar manner as described referring to the example case of selecting the keyword button K1 or K2 shown in FIG. 8. More than one type of document list button may be displayed by the user interface 111 before or at the timing when the keyword d1 is displayed.

Figure 10:
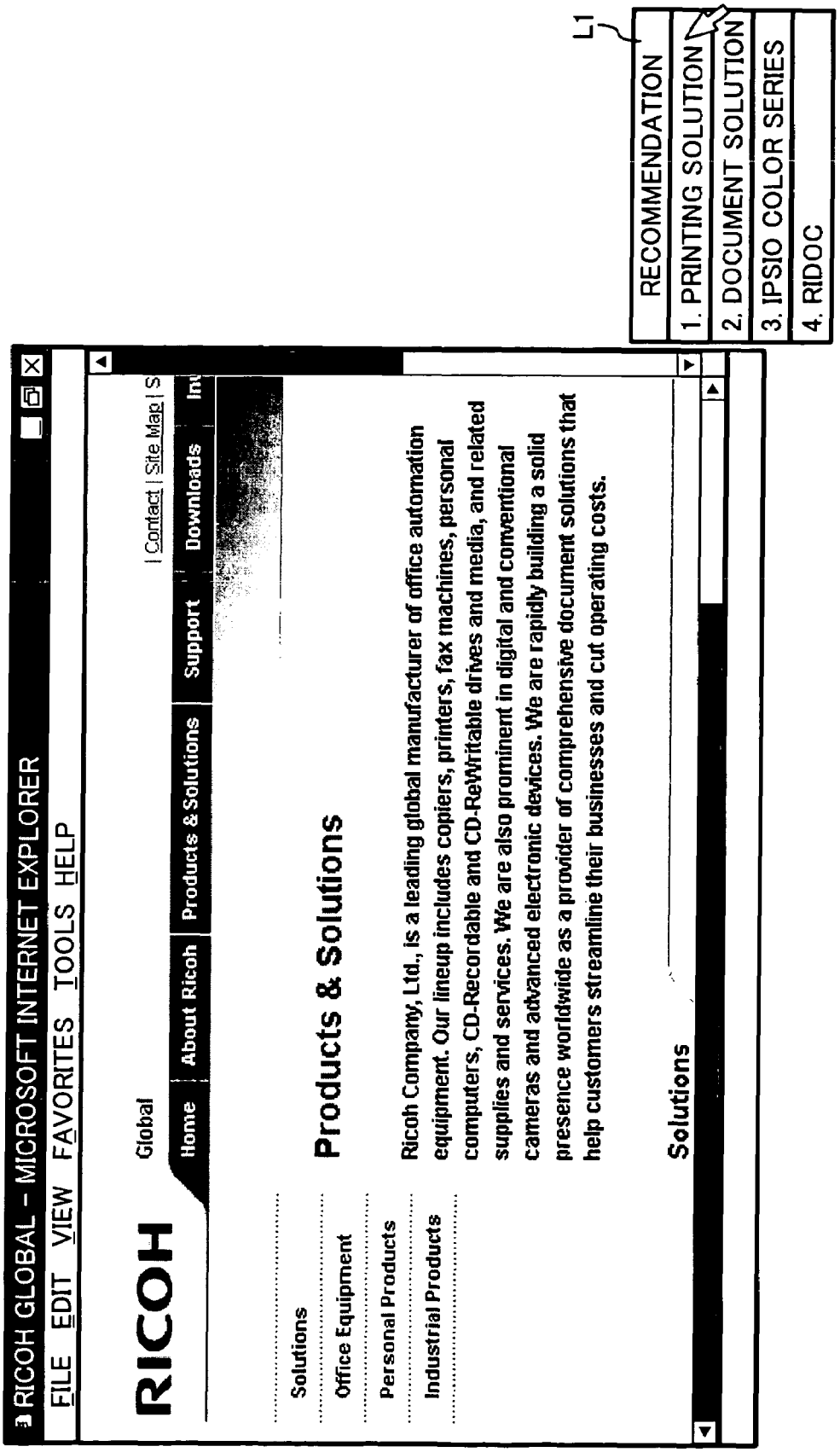
FIG. 10 is an example screen displayed to a user interacting with an information management system of the present invention.

In another example, the user assistant 112 may automatically request the context manager 121 to provide the reference document list, by sending a request along with the document ID "D1" of the first document data D1 at S101 before the user selects any keyword. As described below in greater detail, in one example, the user assistant 112 may send a request including the document ID "D1" to the context manager 121 to cause the context manager 121 to generate the reference document list. In another example, the user assistant 112 may select a keyword that corresponds to the document ID, for example, from a keyword database that may be provided in the user interface 111. Once the keyword is extracted from the database, the user assistant 112 may cause the context manager 121 to generate the reference document list. Upon receiving the reference document list from the context manager 121, the user assistant 112 may display the reference document list, for example, in the form of pop-up menu as illustrated in FIG. 10. The reference document list L1 of FIG. 10 lists four document data that are predicted to be relevant to the document data being displayed to the user. In this manner, the user assistant 112 may eliminate the jobs to be performed by the user.

As described above referring to FIG. 6, various kinds of data elements may be captured by the user interface 111 as context information in relation to one search task. In order to make the context information usable or editable, the context manager 121 stores the context information in the form of metadata, for example, as illustrated in FIG. 11. In the example case illustrated in FIG. 11, the context information received from the user interface 111 is stored according to the user ID. Thus, the metadata resource shown in FIG. 11 corresponds to a personalized metadata resource, which indicates the past search activities of an individual user. Referring to FIG. 11, the first document data being displayed first is referred to as the "source data". The second document data being accessed is referred to as the "destination data". By organizing the data elements by user, source document, and destination document, the context, such as the reference relationship between the first document data and the second document data, may be captured as explained below.

In a first example context, the user "P1" views the source document data D1 having the document ID "D1", selects the keyword d1 from the source document data D1, accesses the destination document data D2 having the document ID "D2", and recommends the second document data D2. The source document data D1 is stored in the folder F1, while the destination document data D2 is stored in the folder F2.

In a second example context, the user having the user ID "P1" views the source document data D1 having the document ID "D1", selects the keyword d1 from the source document data D1, and accesses the destination document data D2 having the document ID "D2". The source document data D1 is stored in the folder F1, while the destination document data D2 is stored in the folder F2.

In a third example context, the user having the user ID "P1" views the source document data D1 having the document ID "D1", displays a reference document list that lists document data relevant to the source document data D1, accesses the destination document data D2 having the document ID "D2", and recommends the destination document data D2. The source document data D1 is stored in the folder F1, while the destination document data D2 is stored in the folder F2.

In a fourth example context, the user having the user ID "P1" views the source document data D1 having the document ID "D1", displays a reference document list that lists document data relevant to the source document data D1, and accesses the destination document data D2 having the document ID "D2". The source document data D1 is stored in the folder F1, while the destination document data D2 is stored in the folder F2.

In a fifth example context, the user having the user ID "P1" views the source document data D1 having the document ID "D1 ", selects the keyword d1 from the keyword button, accesses the destination document data D2 having the document ID "D2", and recommend the destination document data D2. The source document data D1 is stored in the folder F1, while the destination document data D2 is stored in the folder F2.

In a sixth example context, the user having the user ID "P1" views the source document data D1 having the document ID "D1", selects the keyword d1 from the keyword button, and accesses the destination document data D2 having the document ID "D2". The source document data D1 is stored in the folder F1, while the destination document data D2 is stored in the folder F2.

In a seventh example context, the user having the user ID "P1" views the source document data D1 having the document ID "D1", selects the keyword d1 from the source document data D1, and accesses the destination document data D3 having the document ID "D3". The source document data D1 is stored in the folder F1, while the destination document data D3 is stored in the folder F2.

In addition to or in alternative to the metadata resource shown in FIG. 11, the context manager 121 may generate any other kind of metadata resource. Alternatively, the context manager 121 may generate any other kind of metadata resource, from the metadata resource shown in FIG. 11.

In one example, the context manager 121 generates a document metadata resource describing the context information specific to the document data. Referring to FIG. 11, a document metadata resource for the first document data "D1" may be generated from the context information describing the first to seventh contexts. Using the document metadata resource, various kinds of information that may be useful to the user may be driven including:

destination document data and source document data having a strong reference relationship; first document data and second document data having a strong reference relationship; destination document data and source document data having a reference relationship; first document data and second document data having a reference relationship; and destination document data and source document data/keyword having a strong reference relationship.

In another example, the context manager 121 generates a keyword metadata resource describing the context information specific to the keyword. Referring to FIG. 11, the keyword metadata resource may be generated from the context information describing the first, second, fifth, sixth, and seventh contexts. Using the keyword metadata resource, various kinds of information that may be useful to the user may be driven including:

destination document data and source keyword having a strong reference relationship; and destination document data and source keyword having a reference relationship.

In another example, the context manager 121 generates a document-keyword metadata resource describing the context information related to the keyword and the source document data. Referring to FIG. 11, the document-keyword metadata resource may be generated from the context information describing the first, second, fifth, sixth, and seventh contexts. Using the document-keyword metadata resource, various kinds of information that may be useful to the user may be driven including:

destination document data and source document data/keyword having a strong reference relationship.

In another example, the context manager 121 generates a folder metadata resource describing the context information specific to the folder containing the document data. For example, the folder metadata resource may be generated for the folder F1 using the context information describing the first to seventh contexts. Using the source folder metadata resource, various kinds of information that may be useful to the user may be driven including:

destination document data and a folder containing source document data having a strong reference relationship; first document data and a folder containing second document data having a strong reference relationship; destination document data and a folder containing source document data having a reference relationship; and first document data and a folder containing second document data having a reference relationship.

In another example, the context manager 121 generates an integrated metadata resource describing the context information related to all entities, having all data elements. The integrated metadata resource may be used to generate any one of the above-described and other metadata resources, for example, depending on how the metadata resource is used for generating a search result.

For example, if the metadata manager 121 is instructed to generate a keyword button, the document-keyword metadata resource may be generated and used to generate the keyword button. In another example, if the metadata manager 121 is instructed to generate a reference document list that lists document data relevant to source document data, the metadata manager 121 may generate the document metadata resource. In another example, if the metadata manager 121 is instructed to generate a keyword-driven document list that lists document data relevant to the selected keyword, the metadata manager 121 may generate the document-keyword metadata resource. In another example, if the metadata manager 121 is instructed to generate a personalized reference document list that lists document data relevant to source document data, the metadata manager 121 may generate, for the specific user, the document metadata resource.

In another example, the context manager 121 may generate an appearance rate metadata resource describing the context information related to the appearance rate of the document data. The rate of appearance, which may be obtained by the number of counts related to the document ID, may be obtained for any kind of document data. The appearance rate metadata resource may be used to determine the order in which the searched document data is listed when the reference document list is output to the user. Alternatively, the appearance rate metadata resource may be used to restrict the number of document data for output before or after the search.

In another example, the context manager 121 may rank the context information, using any kind of ranking rule other than the appearance rate. The context information, or the context described by the context information, may be weighted based on the degree and direction of the reference relationship being represented. For example, the document data being recommended may be weighted more heavily than the document data being referred. The destination document data being accessed from the source document data may be weighted more heavily than the document data that is not always accessed. The document data referred by the source document data may be weighted more heavily than the document data referred by other document data located in the same folder as the source document data. The document data referred by one particular user may be weighted more heavily than the document data referred by users in general.

In the example case illustrated in FIG. 12A or 12B, the contexts stored in the metadata resource are classified into several context types, A, B, C, D, I, J, K, and L. Based on the degree and direction of the reference relationship, each context type is assigned with a weighting factor expressed by the number of points. In FIG. 12A or 12B, the cell having the subject document data is darkened. The arrow indicates the direction of the reference relationship. The line without the arrow indicates the location, or the folder, of the document data. FIG. 12A corresponds to a metadata resource generated for the general users, while FIG. 12B corresponds to a personalized metadata resource generated for a particular user.

As illustrated in the example case of context type A, if the subject document data D3 is source document data having a strong reference relationship with destination data D4, 20 points are added. As illustrated in the example case of context type B, if the subject document data D3 is destination document data having a strong reference relationship with source document data D4, 16 points are added. As illustrated in the example case of context type C, if the subject document data D3 is source document data having a reference relationship with destination document data D4, 10 points are added. As illustrated in the example case of context type D, if the subject document data D3 is destination document data having a reference relationship with source document data D4, 7 points are added.

As illustrated in the example case of context type I, if the subject document data D3 is other document data, which is located in a folder F3 having destination document data D4 that has a strong reference relationship with source document data D5, 4 points are added. As illustrated in the example case of context type J, if the subject document data D3 is other document data, which is located in a folder F3 having destination document data D5 that has a strong reference relationship with source document data D4, 3 points are added. As illustrated in the example case of context type K, if the subject document data D3 is other document data, which is located in a folder F3 having source document data D5 that has a reference relationship with destination document data D4, 2 points are added. As illustrated in the example case of context type L, if the subject document data D3 is other document data, which is located in a folder F having destination document data that has a reference relationship with the source document data, 1 point is added.

As illustrated in FIG. 12B, the context information stored in the personalized metadata resource may be weighted in a substantially similar manner. By weighting the contexts, the number of document data may be restricted before or after the search.

In another example, the weighting factor and the appearance rate may be taken into account to rank the contexts, or the context information, in the metadata resource. For example, as illustrated in FIG. 13A or 13B, the weighting factor and the appearance rate are multiplied together to obtain the total point. Based on this total point, the context information may be analyzed.

Figure 14:
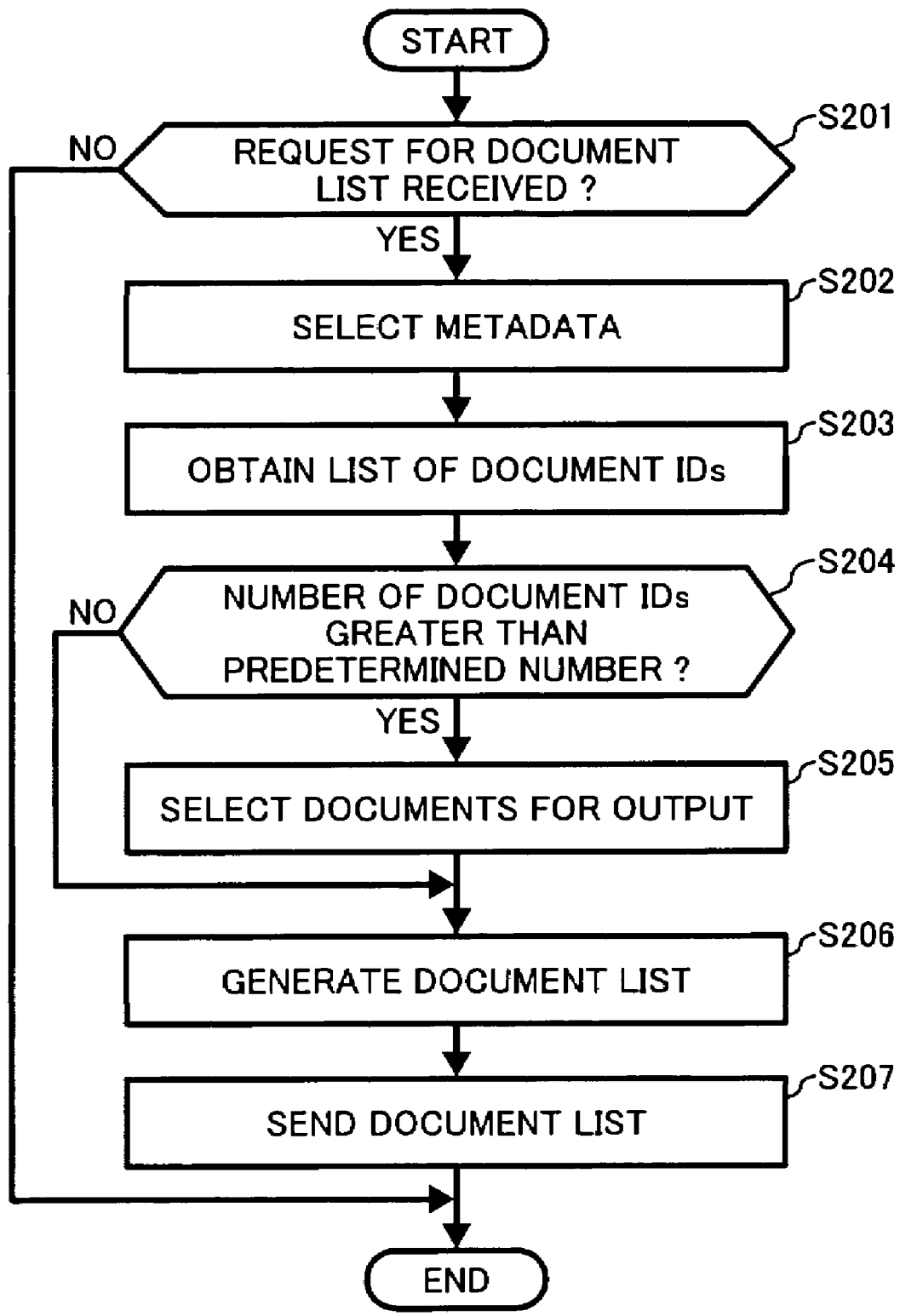
FIG. 14 is a flowchart illustrating operation of generating a document result according to an example embodiment of the present invention.

Referring now to FIG. 14, operation of generating any type of the reference document lists is explained according to an example embodiment of the present invention. In this example, the context manager 121 is assumed to perform the operation of FIG. 14 upon receiving a request from the user interface 111. However, the context manager 121 may perform the operation shown in FIG. 14 at any other timing.

At S201, the context manager 121 determines whether a request for generating any type of the document list is received. Such instruction may be received from the user interface 111 as described above.

At S202, the context manager 121 selects at least one of metadata resources stored in the metadata database 122. In one example, if the request for the document-driven reference document list is received at S201, the context manager 121 selects the document metadata resource. In another example, if the request for the keyword-driven reference document list is received at S201, the context manager 121 selects the document-keyword metadata resource or the keyword metadata resource.

At S203, the context manager 121 obtains a list of document IDs of the document data having the reference relationship with the first document data being displayed. In one example, if the request for the document-driven document list is received at S201, the context manager 121 extracts the document ID of the first document data being displayed from the request, and obtains one or more document IDs that have the reference relationship with the first document data by searching through the document metadata resource. In another example, if the request for the keyword-driven document list is received at S201, the context manager 121 extracts the document ID or the keyword d1 of the first document data being displayed from the request, and obtains one or more document IDs that have the reference relationship with the first document by searching through the document-keyword metadata resource or the keyword metadata resource.

At S204, the context manager 121 determines whether the number of document IDs obtained at S203 is greater than a predetermined number. If the number is greater than the predetermined number ("YES" at S204), the operation proceeds to S205. Otherwise ("NO" at S204), the operation proceeds to S206.

At S205, the context manager 121 selects the predetermined number of document IDs, for example, by classifying and ranking the entries of the context information stored in the metadata resource as described above.

At S206, the context manager 121 generates a reference document list.

At S207, the context manager 121 sends the reference document list to the user interface 111, and the operation ends.

The operation of FIG. 14 may be performed in various other ways. For example, S204 and S205 of restricting the number of documents may not be performed.

Figure 15:
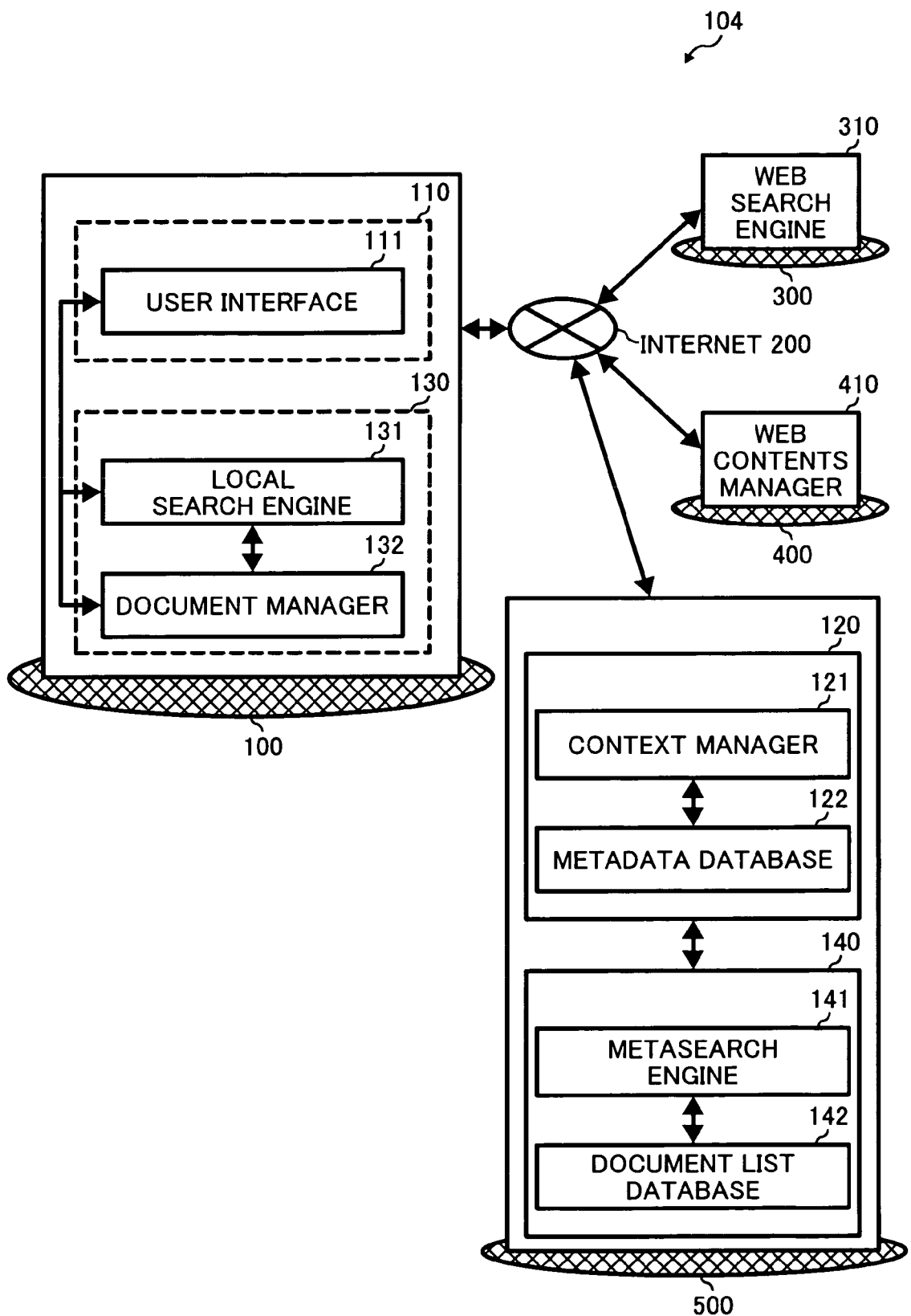
FIG. 15 is a schematic block diagram illustrating the structure of an information management system, according to an example embodiment of the present invention.

Referring now to FIG. 15, the structure of an information management system 104 is explained according to an example embodiment of the present invention. The information management system 104 is substantially similar in structure to the information management system 102 of FIG. 2. The differences include the addition of a document list management server 140, which includes a metasearch engine 141 and a document list database 142.

The document list database 142 stores information regarding document data having the reference relationship with the first document data being displayed, such as a reference document list generated by the context manager 121. The metasearch engine 141 receives a search request from the user interface 111, extracts a keyword from the search request, and searches through the document list database 142 to obtain one or more document data corresponding to the keyword. The metasearch engine 141 may further send the search result to the user interface 111. In this manner, the search task may be performed more efficiently as the subject for search is limited to the document data having the reference relationship.

Figure 16:
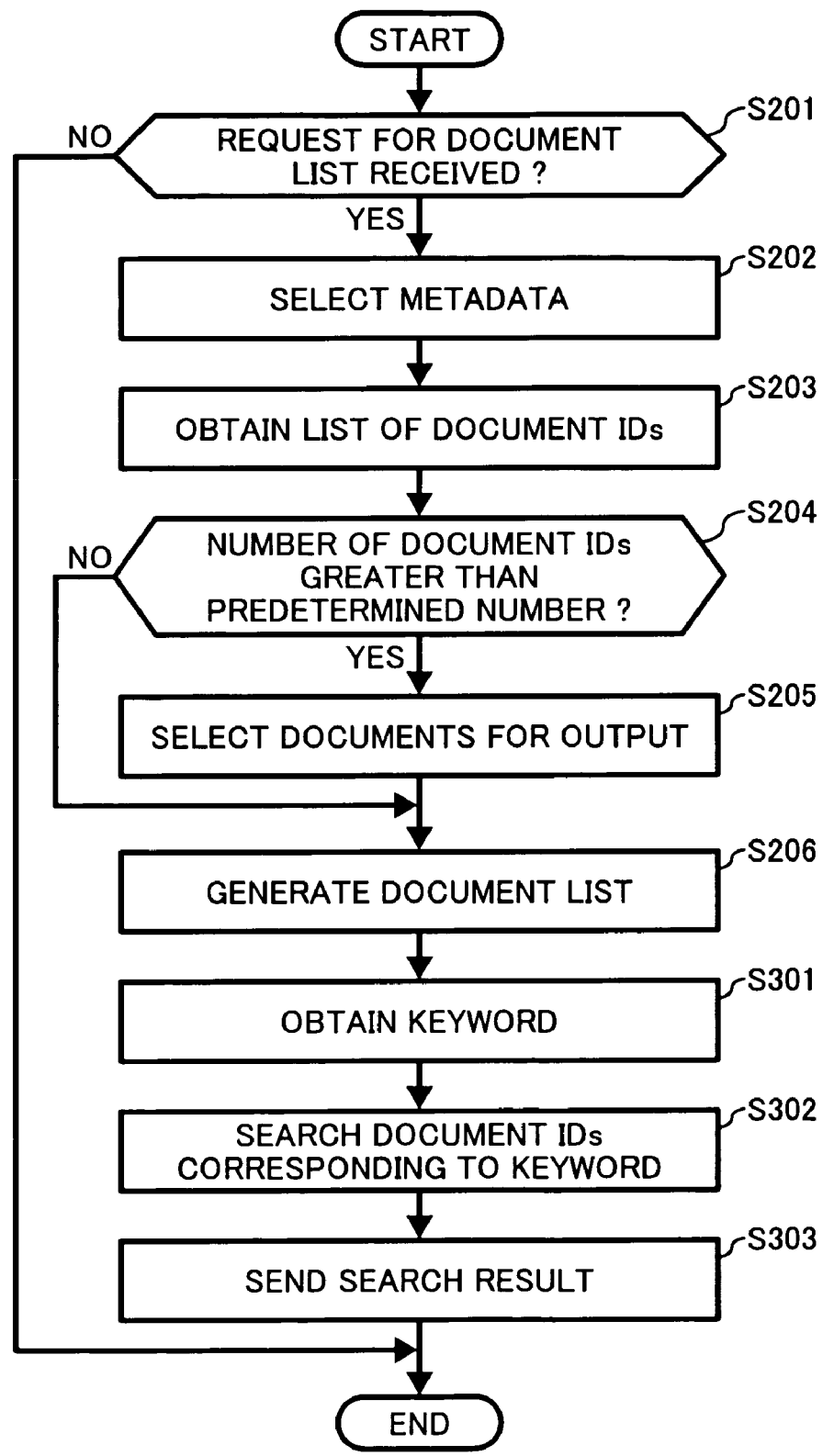
FIG. 16 is a flowchart illustrating operation of performing a search using one or more metadata resources, according to an example embodiment of the present invention.

Referring to FIG. 16, operation of searching document data is explained according to an example embodiment of the present invention. The operation of FIG. 16 is substantially similar to the operation of FIG. 14. The differences include the replacement of Step S207 with Steps S301, S302, and S303.

At S301, upon receiving a search request from the user interface 111, the metasearch engine 141 may extract a keyword from the search result. At S301, the metasearch engine 141 receives a reference document list from the context manager 121.

The reference document list, which is a list of document IDs of the document data having the reference relationship with the first document data being displayed, is generated by the context manager 121 as described above referring to Steps S201 to S206.

At S302, the metasearch engine 141 searches through the reference document list to extract one or more document data corresponding to the keyword to generate a search result.

At S303, the metasearch engine 141 sends the search result to the user interface 111, and the operation ends.

Figure 17:
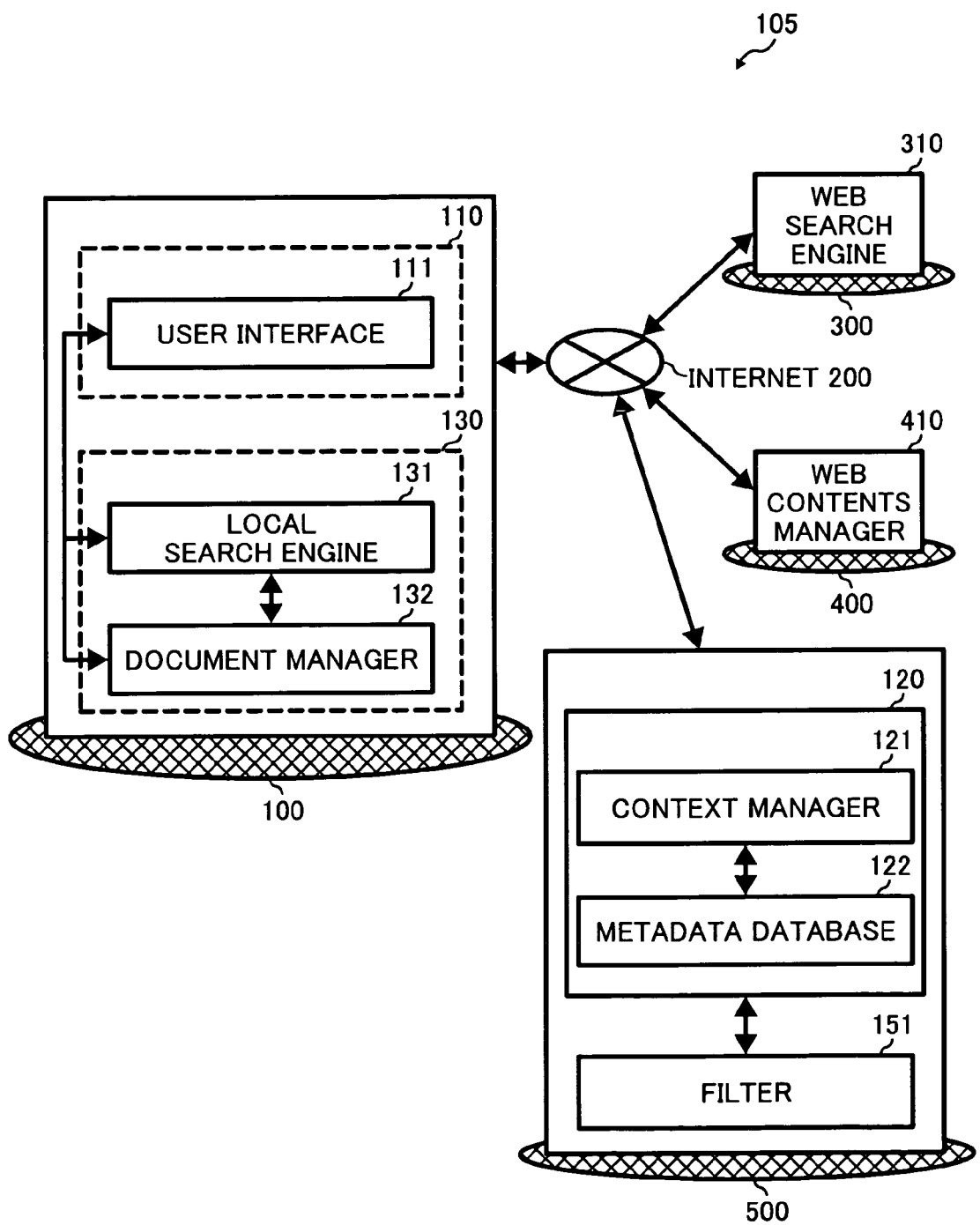
FIG. 17 is a schematic block diagram illustrating the structure of an information management system, according to an example embodiment of the present invention.

Referring now to FIG. 17, the structure of an information management system 105 is explained according to an example embodiment of the present invention. The information management system 105 is substantially similar in structure to the information management system 102 of FIG. 2. The differences include the addition of a filter 151.

The filter 151 compares a search result, which may be received from any kind of search engine, with a reference document list generated by the context manager 121 to output a filtered search result.

Figure 18:
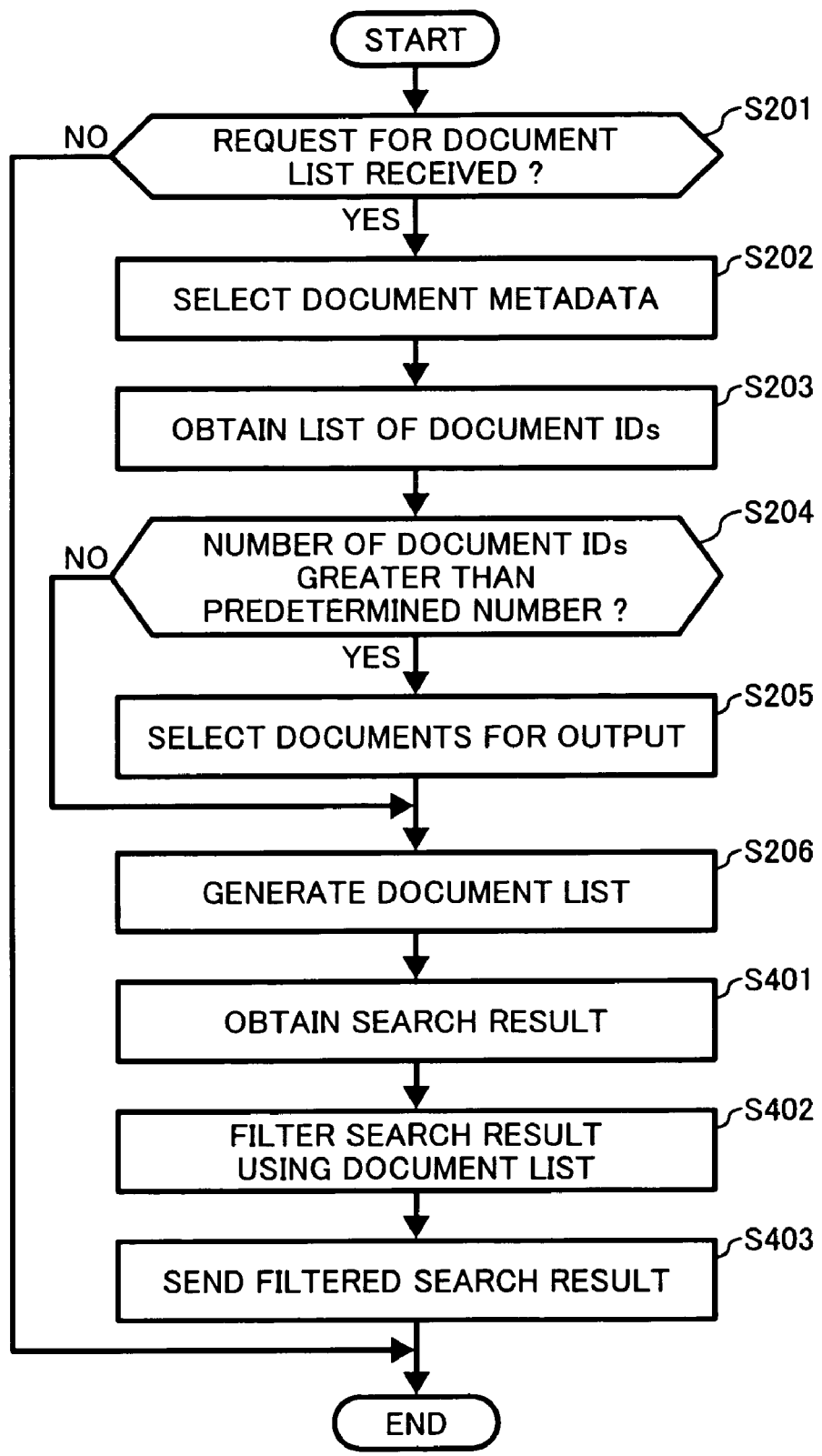
FIG. 18 is a flowchart illustrating operation of performing a search using one or more metadata resources, according to an example embodiment of the present invention.

Referring to FIG. 18, operation of searching document data is explained according to an example embodiment of the present invention. The operation of FIG. 18 is substantially similar to the operation of FIG. 14. The differences include the replacement of Step S207 with Steps S401, S402, and S403.

At S401, the filter 151 obtains a search result, which is a list of document IDs of the document data that matches the keyword selected by the user. The search result may be obtained by any kind of search engine, such as the web search engine 310 or the local search engine 131. At S401, the filter 151 additionally receives a reference document list from the context manager 121. The reference document list, which is a list of document IDs of the document data having the reference relationship with the first document data being displayed, is generated by the context manager 121 as described above referring to Steps S201 to S206.

At S402, the filter 151 compares between the search result and the reference document list, and extracts the document IDs of the document data that are listed in both of the search result and the reference document to generate a filtered search result.

At S403, the filter 151 sends the filtered search result to the user interface 111, and the operation ends.

Referring to FIG. 18, operation of searching document data is explained according to an example embodiment of the present invention. The operation of FIG. 18 is substantially similar to the operation of FIG. 14. The differences include the replacement of Step S207 with Steps S401, S402, and S403.

Figure 19:
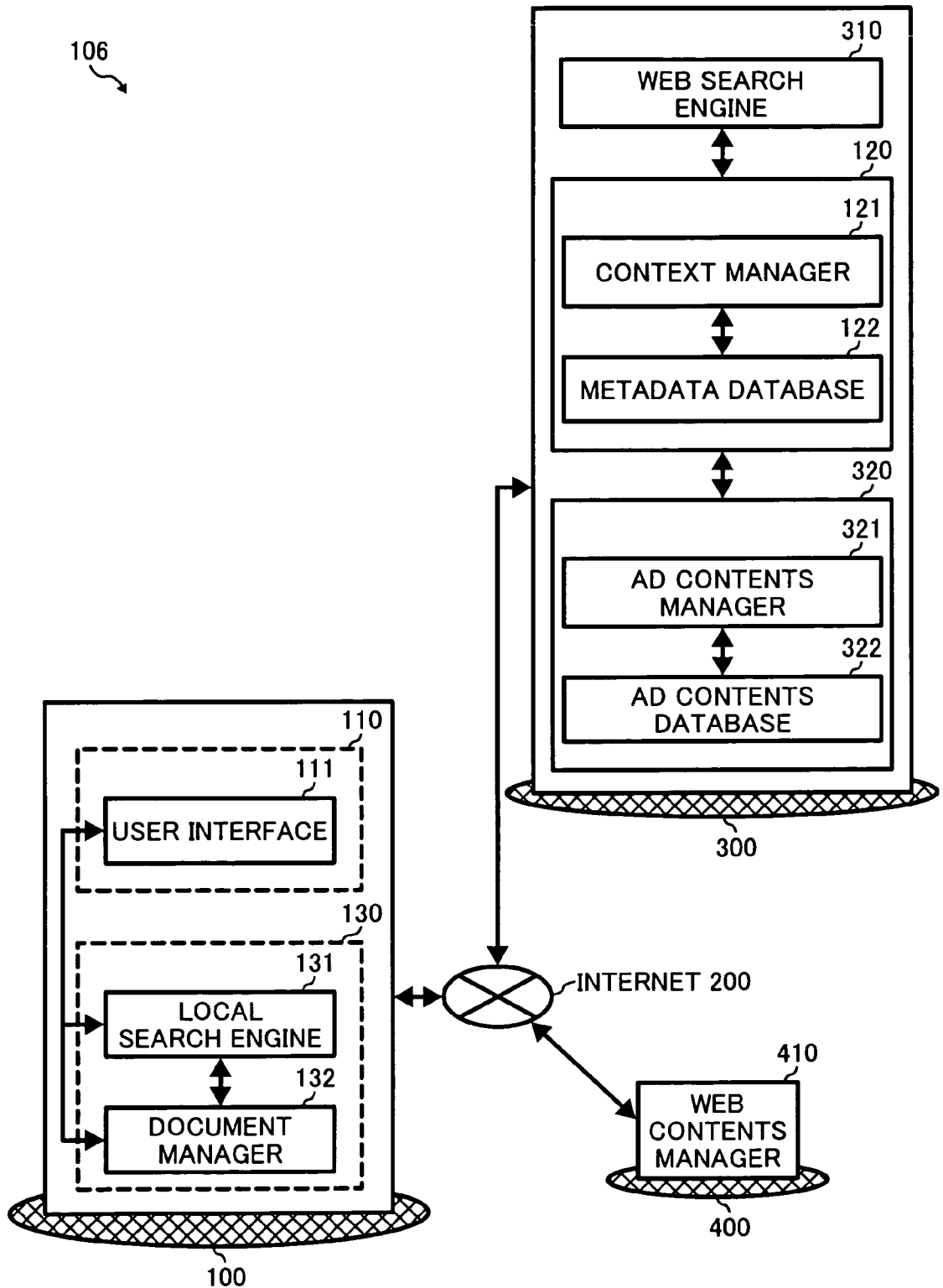
FIG. 19 is a schematic block diagram illustrating the structure of an information management system, according to an example embodiment of the present invention.

Referring now to FIG. 19, the structure of an information management system 106 is explained according to an example embodiment of the present invention. The information management system 106 is substantially similar in structure to the information management system 103 of FIG. 3. The differences include the addition of an advertisement (AD) contents manager 121 and an AD contents database 322.

The AD contents manager 121 manages a plurality of AD contents stored in the AD contents database 322.

Figure 20:
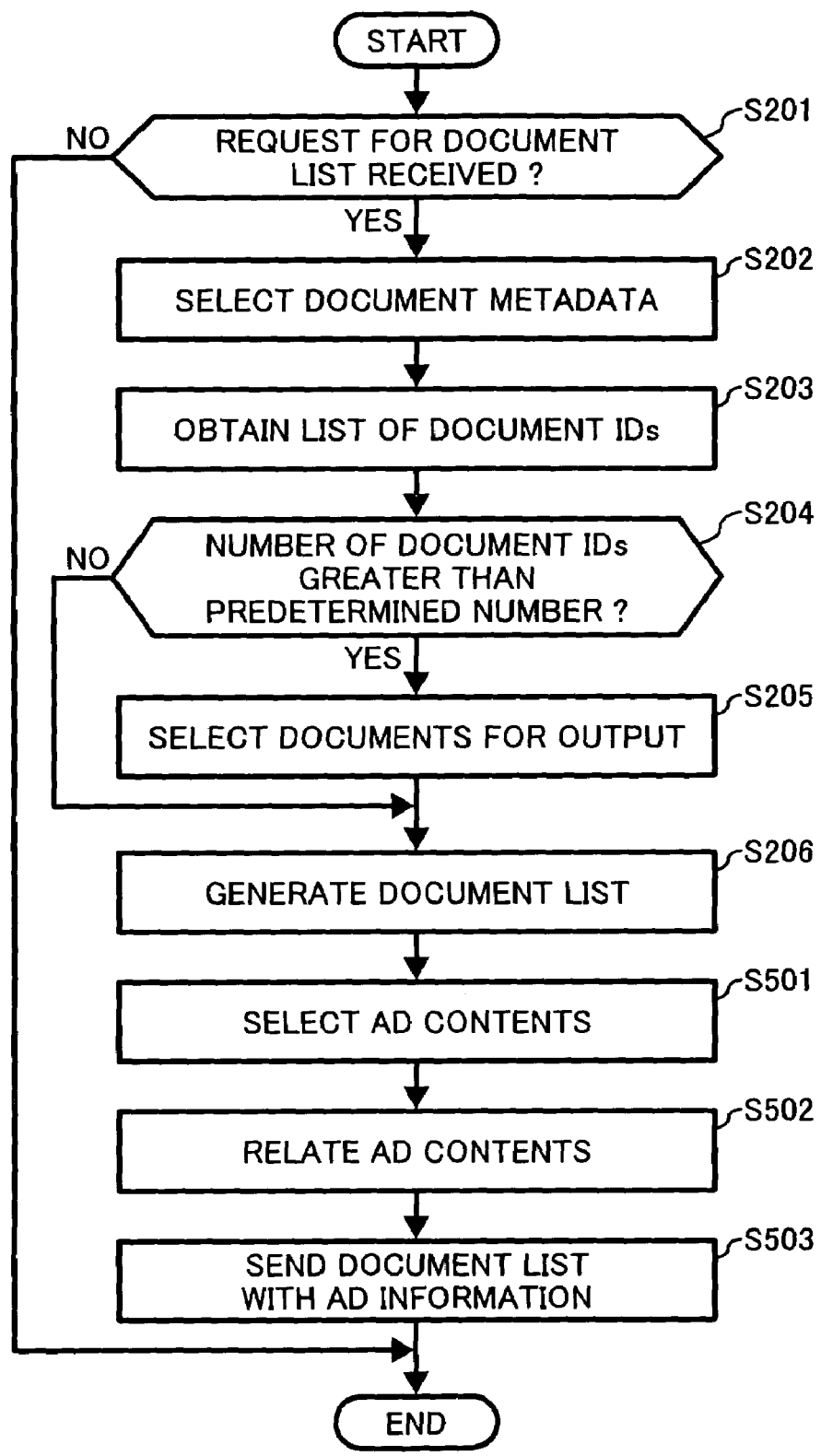
FIG. 20 is a flowchart illustrating operation of selecting advertisement contents using one or more metadata resource, according to an example embodiment of the present invention.

Referring to FIG. 20, operation of searching advertisement contents is explained according to an example embodiment of the present invention. The operation of FIG. 18 is substantially similar to the operation of FIG. 14. The differences include the replacement of Step S207 with Steps S501, S502, and S503.

At S501, the AD contents manager 321 receives a reference document list from the context manager 121, and searches through the AD contents database 322 to obtain one or more AD contents that match the document data listed by the reference document list. The reference document list, which is a list of document IDs of the document data having the reference relationship with the first document data being displayed, is generated by the context manager 121 as described above referring to Steps S201 to S206.

At S502, the AD contents manager 321 relate one or more AD contents to each document ID of the document listed by the reference document list to generate AD information indicating this relationship.

At S503, the AD contents manager 321 sends the reference document list with the AD information, and the operation ends.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An information management system, comprising:
a search assistant configured to cause the information management system to perform a search task when first document data is displayed to a first user and to obtain a plurality of data elements in relation to the search task, wherein, when the search task is performed, the search assistant is configured to
receive from the first user both a request for acquiring a search result and also first keyword information derived from the first document data;
receive the search result including information regarding one or more document data that matches the first keyword information from a search engine; and
display second document data to the first user, the second document data being selected by the first user from the search result;
a context information generator configured to generate context information including the plurality of data elements that together describe the context in which the search task is performed, the plurality of data elements including first document identification information of the first document data, the first keyword information, and second document identification information of the second document data; and
a context manager configured to generate one or more metadata resources based on the context information and to store the one or more metadata resources in a metadata database,
wherein when the first document data is displayed to a second user after the search task is performed by the search assistant, the search assistant sends a request for acquiring a document list to the context manager together with the first document identification information of the first document data and second keyword information derived from the first document data; and
the context manager is configured to select at least one of the one or more metadata resources using the first document identification information of the first document data and the second keyword information derived from the first document data, and to generate a document list for display to the second user using the at least one of the one or more metadata resources that is selected, wherein the document list includes information regarding one or more document data that is assumed to be related to the first document data and the second keyword information.

2. The system of claim 1, wherein the first keyword information is selected by the first user directly from the first document data that is displayed when the search task is performed.

3. The system of claim 2, wherein the search assistant is configured to select the second keyword information from a keyword database, and to send the second keyword information together with the request for acquiring the document list and the first document identification information to the context manager.

4. The system of claim 3, wherein the second keyword information is selected by the second user directly from the first document data that is displayed.

5. The system of claim 2, wherein when the context manager generates the one or more metadata resources, the context manager is configured to classify the plurality of data elements of the context information into source document data elements and destination document data elements to generate the one or more metadata resources indicating a reference relationship between the first document data and the second document data;
the source document data elements include the first document identification information of the first document data and the first keyword information derived from the first document data; and
the destination document data elements include the second document identification information of the second document data.

6. The system of claim 5, wherein the plurality of data elements of the context information further comprises:
first folder identification information indicating a first folder containing the first document data; and
second folder identification information indicating a second folder containing the second document data,
wherein the source document data elements further include the first folder identification information, and the destination document data elements further include the second folder identification information.

7. The system of claim 6, wherein the search assistant is further configured to:
receive user input indicating that the first user recommends the second document data when the second document data is displayed to the first user,
wherein the plurality of data elements further comprises recommendation information indicating that the user input indicating that the first user recommends the second document data is received, and wherein
when the context manager generates the one or more metadata resources, the context manager is configured to organize the second document identification information differently between when the recommendation information is present and when the recommendation information is not present to generate the one or more metadata resources further indicating whether the reference relationship between the first document data and the second document data is strong.

8. The system of claim 2, wherein when the request for acquiring the document list is received from the search assistant, the context manager is further configured to analyze the request to identify a requested type of the document list, to generate a metadata resource by organizing the plurality of data elements of the context information according to the requested type of the document list, and to generate the document list for display to the second user using the metadata resource that is generated.

9. The system of claim 2, wherein the search assistant is further configured to obtain user identification information identifying the first user, wherein the plurality of data elements of the context information further includes the user identification information; and the context manager is configured to organize the plurality of data elements by the user identification information and to generate personalized metadata resource specific to the first user, and to generate the document list using the personalized metadata resource specific to the first user when the second user is identified as the first user.

10. The system of claim 2, further comprising:

an advertisement manager configured to search through a plurality of advertisement contents that correspond to the one or more document data indicated by the information obtained from the search result or the document list.

11. An information management apparatus, comprising:

a search assistant configured to cause the information management apparatus to perform a search task when first document data is displayed to a first user and to obtain a plurality of data elements in relation to the search task, wherein, when the search task is performed, the search assistant is configured to receive from the first user both a request for acquiring a search result and also first keyword information derived from the first document data;

receive the search result including information regarding one or more document data that matches the first keyword information from a search engine; and display second document data to the first user, the second document data being selected by the first user from the search result;

a context information generator configured to generate context information including the plurality of data elements that together describe the context in which the search task is performed, the plurality of data elements including first document identification information of the first document data, the first keyword information, and second document identification information of the second document data; and a context manager configured to generate one or more metadata resources based on the context information and to store the one or more metadata resources in a metadata database, wherein when the first document data is displayed to a second user after the search task is performed by the search assistant, the search assistant sends a request for acquiring a document list to the context manager together with the first document identification information of the first document data and second keyword information derived from the first document data; and the context manager is configured to select at least one of the one or more metadata resources using the first document identification information of the first document data and the second keyword information derived from the first document data, and to generate a document list for display to the second user using the at least one of the one or more metadata resources that is selected, wherein the document list includes information regarding one or more document data that is assumed to be related to the first document data and the second keyword information.

12. The apparatus of claim 11, wherein the first keyword information is selected by the first user directly from the first document data that is displayed when the search task is performed.

13. The apparatus of claim 12, wherein the search assistant is configured to select the second keyword information from a keyword database, and to send the second keyword information together with the request for acquiring the document list and the first document identification information to the context manager.

14. The apparatus of claim 13, wherein the second keyword information is selected by the second user directly from the first document data that is displayed.

15. The apparatus of claim 12, wherein when the context manager generates the one or more metadata resources, the context manager is configured to classify the plurality of data elements of the context information into source document data elements and destination document data elements to generate the one or more metadata resources indicating a reference relationship between the first document data and the second document data;

the source document data elements include the first document identification information of the first document data and the first keyword information derived from the first document data; and the destination document data elements include the second document identification information of the second document data.

16. The apparatus of claim 15, wherein the plurality of data elements of the context information further comprises:

first folder identification information indicating a first folder containing the first document data; and second folder identification information indicating a second folder containing the second document data, wherein the source document data elements further include the first folder identification information, and the destination document data elements further include the second folder identification information.

17. The apparatus of claim 16, wherein the search assistant is further configured to:

receive user input indicating that the first user recommends the second document data when the second document data is displayed to the first user, wherein the plurality of data elements further comprises recommendation information indicating that the user input indicating that the first user recommends the second document data is received, and wherein when the context manager generates the one or more metadata resources, the context manager is configured to organize the second document identification information differently between when the recommendation information is present and when the recommendation information is not present to generate the one or more metadata resources further indicating whether the reference relationship between the first document data and the second document data is strong.

18. The apparatus of claim 12, wherein when the request for acquiring the document list is received from the search assistant, the context manager is further configured to analyze the request to identify a requested type of the document list, to generate a metadata resource by organizing the plurality of data elements of the context information according to the requested type of the document list, and to generate the document list for display to the second user using the metadata resource that is generated.

19. The apparatus of claim 12, wherein the search assistant is further configured to obtain user identification information identifying the first user, wherein the plurality of data elements of the context information further includes the user identification information; and the context manager is configured to organize the plurality of data elements by the user identification information and to generate personalized metadata resource specific to the first user, and to generate the document list using the personalized metadata resource specific to the first user when the second user is identified as the first user.

20. The apparatus of claim 12, further comprising:
an advertisement manager configured to search through a plurality of advertisement contents that correspond to the one or more document data indicated by the information obtained from the search result or the document list.

21. An information management system, comprising:
means for causing the information management system to perform a search task when first document data is displayed to a first user and to obtain a plurality of data elements in relation to the search task, wherein the means for causing includes
  means for receiving from the first user both a request for acquiring a search result and also first keyword information derived from the first document data;
  means for receiving the search result including information regarding one or more document data that matches the first keyword information from a search engine; and
  means for displaying second document data to the first user, the second document data being selected by the first user from the search result;
means for generating a context information including the plurality of data elements that together describe the context in which the search task is performed, the plurality of data elements including first document identification information of the first document data, the first keyword information, and second document identification information of the second document data; and
means for generating one or more metadata resources based on the context information and to store the one or more metadata resources in a metadata database,
wherein when the first document data is displayed to a second user after the search task is performed by the means for causing, the means for causing sends a request for acquiring a document list to the means for generating one or more metadata resources together with the first document identification information of the first document data and second keyword information derived from the first document data; and
the means for generating one or more metadata resources selects at least one of the one or more metadata resources using the first document identification information of the first document data and the second keyword information derived from the first document data, and to generate a document list for display to the second user using the at least one of the one or more metadata resources that is selected, wherein the document list includes information regarding one or more document data that is assumed to be related to the first document data and the second keyword information.

22. An information management method, comprising:
causing an information management system to perform a search task when first document data is displayed to a first user and to obtain a plurality of data elements in relation to the search task, wherein, when the causing step includes
  receiving from the first user both a request for acquiring a search result and also first keyword information derived from the first document data;
  receiving the search result including information regarding one or more document data that matches the first keyword information from a search engine; and
  displaying second document data to the first user, the second document data being selected by the first user from the search result;
generating context information including the plurality of data elements that together describe the context in which the search task is performed, the plurality of data elements including first document identification information of the first document data, the first keyword information, and second document identification information of the second document data; and
generating one or more metadata resources based on the context information and storing the one or more metadata resources in a metadata database,
wherein when the first document data is displayed to a second user after the search task is performed, the causing step includes sending a request for acquiring a document list together with the first document identification information of the first document data and second keyword information derived from the first document data; and
the step of generating one or more metadata resources includes selecting at least one of the one or more metadata resources using the first document identification information of the first document data and the second keyword information derived from the first document data, and generating a document list for display to the second user using the at least one of the one or more metadata resources that is selected, wherein the document list includes information regarding one or more document data that is assumed to be related to the first document data and the second keyword information.

23. A computer readable medium storing a program that, when executed by a computer, causes the computer to perform the steps of:
causing an information management system to perform a search task when first document data is displayed to a first user and to obtain a plurality of data elements in relation to the search task, wherein, when the causing step includes
  receiving from the first user both a request for acquiring a search result and also first keyword information derived from the first document data;
  receiving the search result including information regarding one or more document data that matches the first keyword information from a search engine; and
  displaying second document data to the first user, the second document data being selected by the first user from the search result;
generating context information including the plurality of data elements that together describe the context in which the search task is performed, the plurality of data elements including first document identification information of the first document data, the first keyword information, and second document identification information of the second document data; and generating one or more metadata resources based on the context information and storing the one or more metadata resources in a metadata database, wherein when the first document data is displayed to a second user after the search task is performed, the causing step includes sending a request for acquiring a document list together with the first document identification information of the first document data and second keyword information derived from the first document data; and the step of generating one or more metadata resources includes selecting at least one of the one or more metadata resources using the first document identification information of the first document data and the second keyword information derived from the first document data, and generating a document list for display to the second user using the at least one of the one or more metadata resources that is selected, wherein the document list includes information regarding one or more document data that is assumed to be related to the first document data and the second keyword information.

* * * * *